United States Patent [19]
Inoue et al.

[11] Patent Number: 6,025,971
[45] Date of Patent: Feb. 15, 2000

[54] MAGNETIC DISK DRIVE USING A NONVOLATILE SOLID STATE MEMORY TO STORE DEFECT INFORMATION

[75] Inventors: Tetsuo Inoue, Ichikawa; Takehito Yamada, Kawasaki; Shigeru Takekado; Kazunori Moriya, both of Tokyo, all of Japan

[73] Assignee: Kabushiki Kaisha Toshiba, Kawasaki, Japan

[21] Appl. No.: 09/061,251

[22] Filed: Apr. 17, 1998

Related U.S. Application Data

[63] Continuation of application No. 08/299,667, Sep. 2, 1994, Pat. No. 5,786,957.

[30] Foreign Application Priority Data

Sep. 2, 1993 [JP] Japan ................................... 5-218288
Dec. 29, 1993 [JP] Japan ................................... 5-351326

[51] Int. Cl.[7] .................................................. G11B 5/596
[52] U.S. Cl. ........................... 360/77.08; 360/48; 360/53
[58] Field of Search .................................. 360/77.08, 22, 360/48, 51, 53; 711/4, 202, 101, 104, 171; 395/500

[56] References Cited

U.S. PATENT DOCUMENTS

| | | | |
|---|---|---|---|
| 4,780,808 | 10/1988 | Moreno et al. | 711/4 |
| 4,796,113 | 1/1989 | Hayakawa | 371/10 |
| 5,041,926 | 8/1991 | Ockerse et al. | 360/77.05 |
| 5,453,974 | 9/1995 | Minoda et al. | 369/275.1 |
| 5,740,358 | 4/1998 | Geldman et al. | 395/184.01 |

*Primary Examiner*—W. Chris Kim
*Attorney, Agent, or Firm*—Oblon, Spivak, McClelland, Maier & Neustadt, P.C.

[57] ABSTRACT

A magnetic head drive of the present invention comprises a composite magnetic head structured by integrally combining a write head into a record head and a magnetic disk having a servo area where position information of the composite magnetic head is recorded and a data area where data is recorded, and the servo area includes a positioning data area having head positioning information, and the head has an erased area generated by recording an AC signal having a frequency higher than a burst pattern in an area other than the burst pattern including information of positioning the composite magnetic head of said positioning data area.

8 Claims, 36 Drawing Sheets

MACROGRAPH NEAR POINT P
(FIGURE FROM MAGNETIC DISK SIDE)

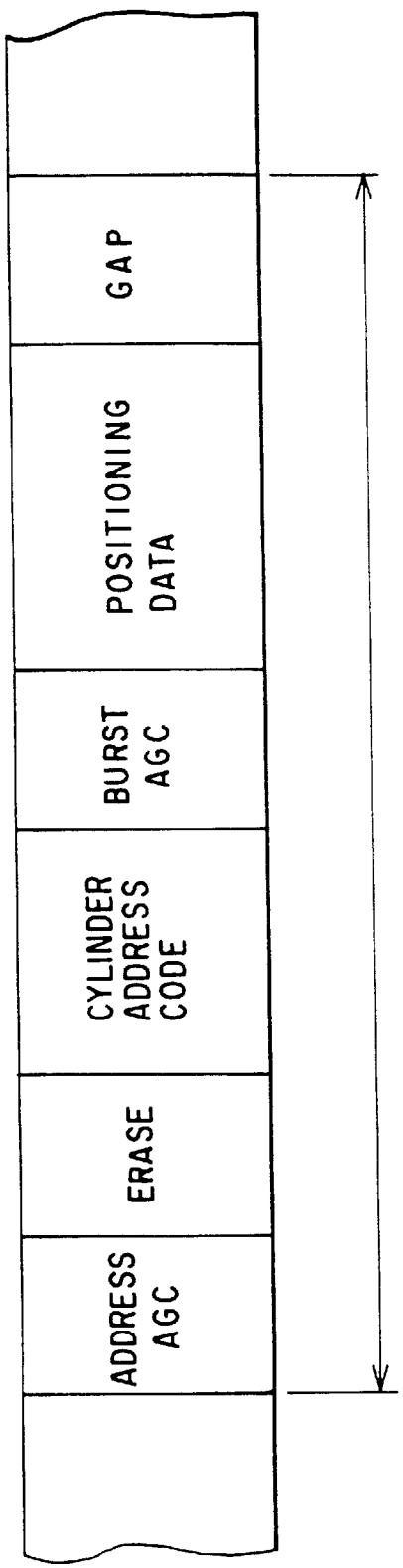
FIG. 7 (PRIOR ART)
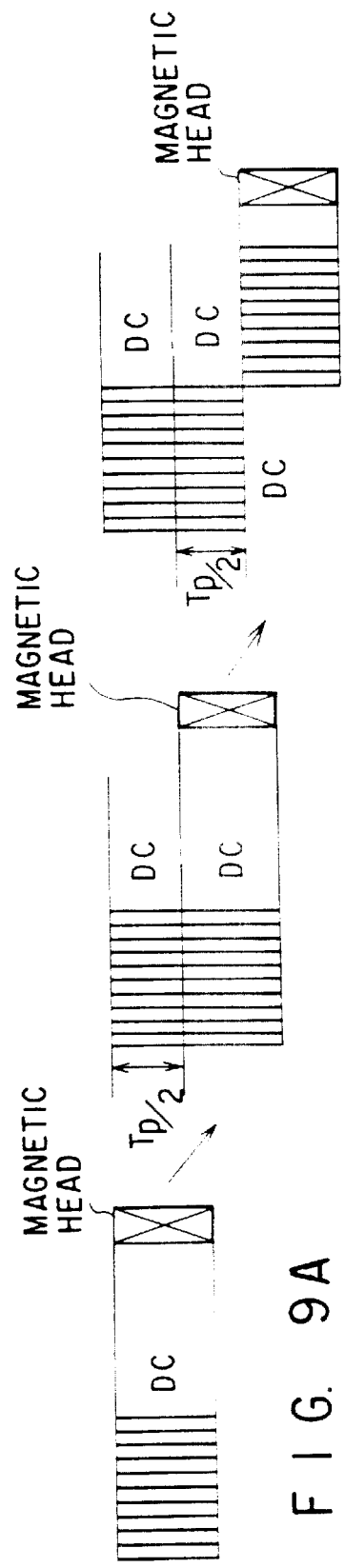
FIG. 9A (PRIOR ART)
FIG. 9B (PRIOR ART)
FIG. 9C (PRIOR ART)

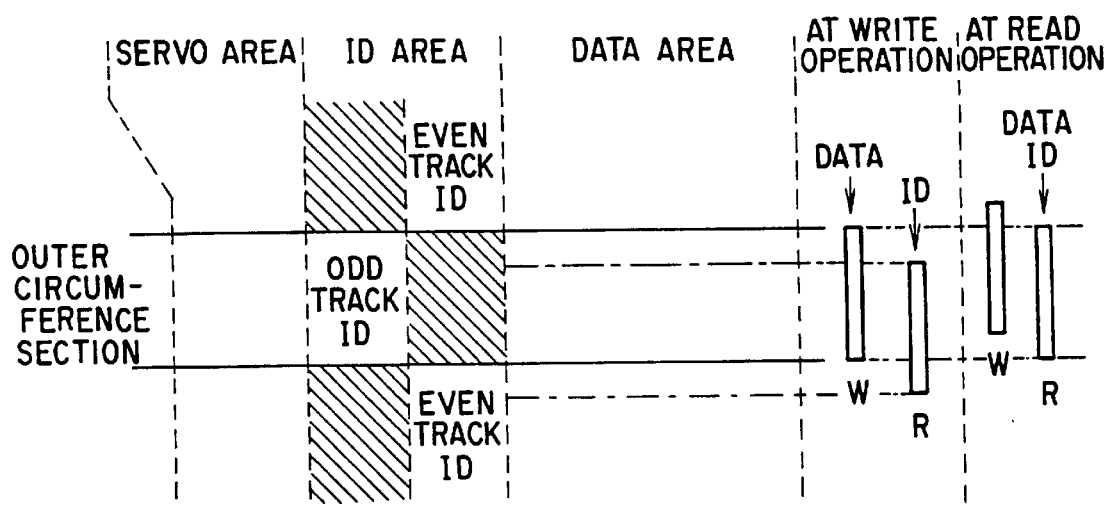
FIG. 12A
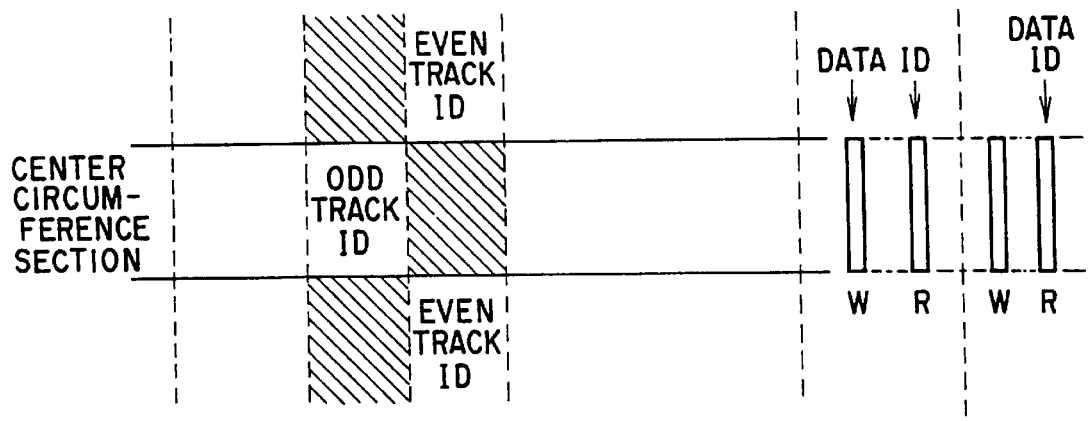
FIG. 12B
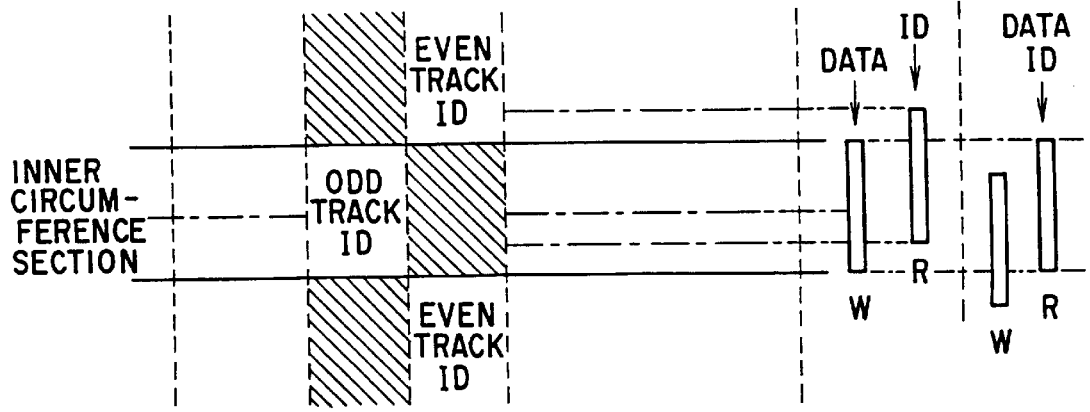
FIG. 12C
 ·· ERASED AREA

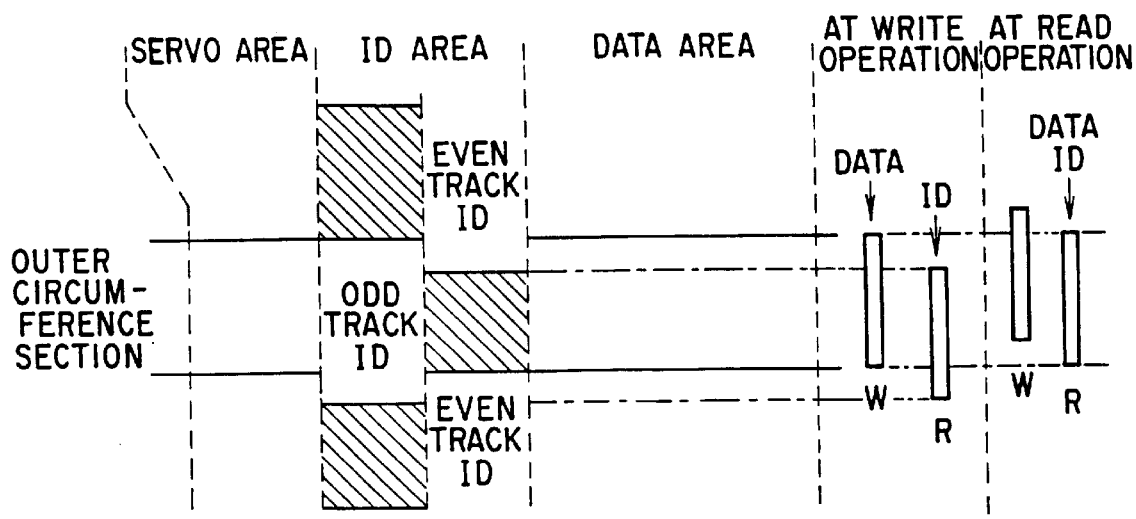
FIG. 14A
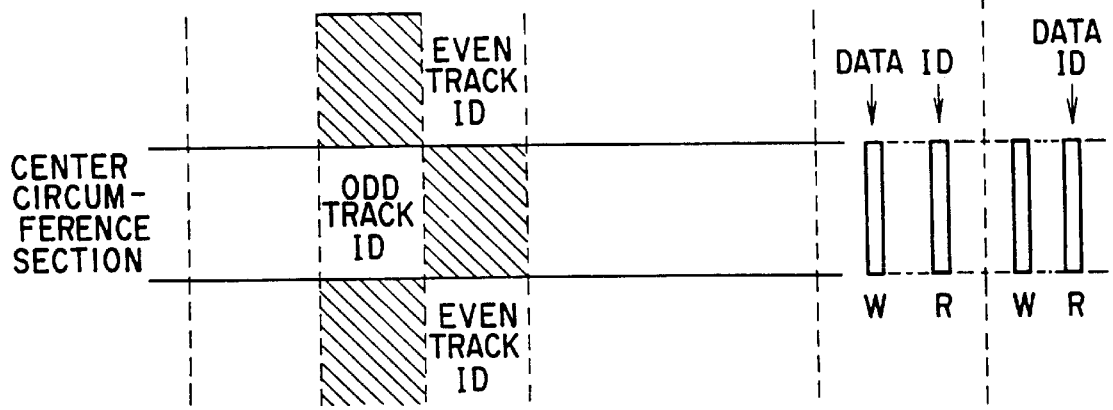
FIG. 14B
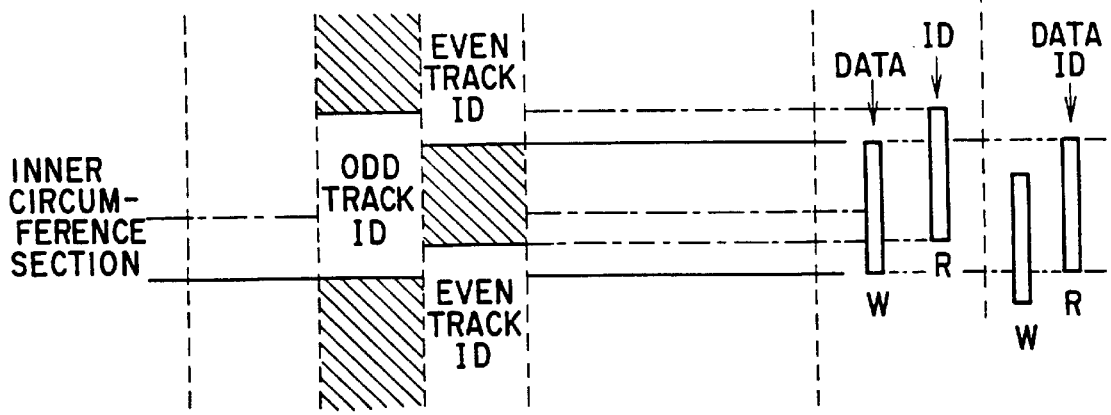
FIG. 14C
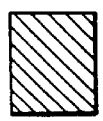 ·· ERASED AREA

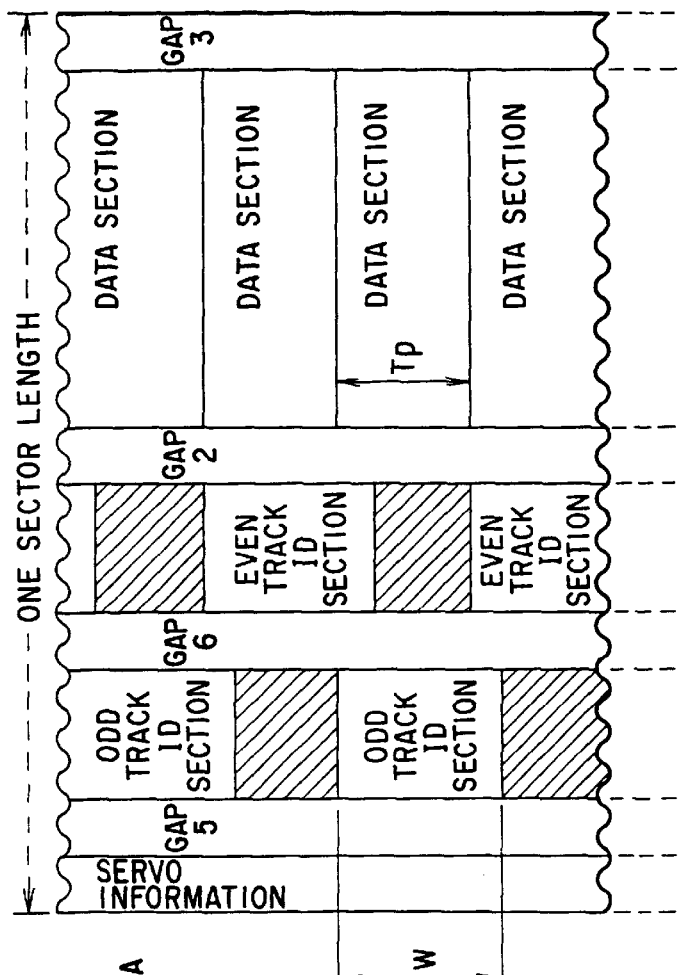
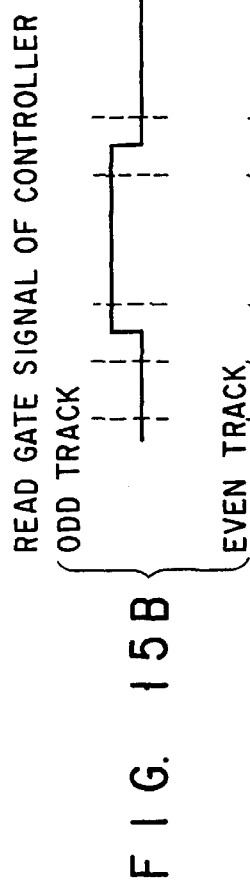
F I G. 15A
F I G. 15B

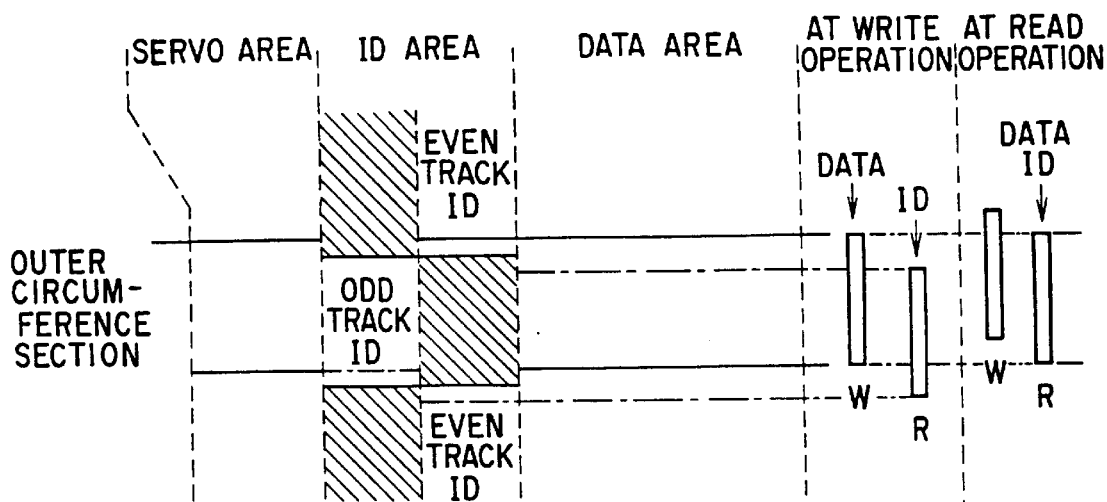
FIG. 16A
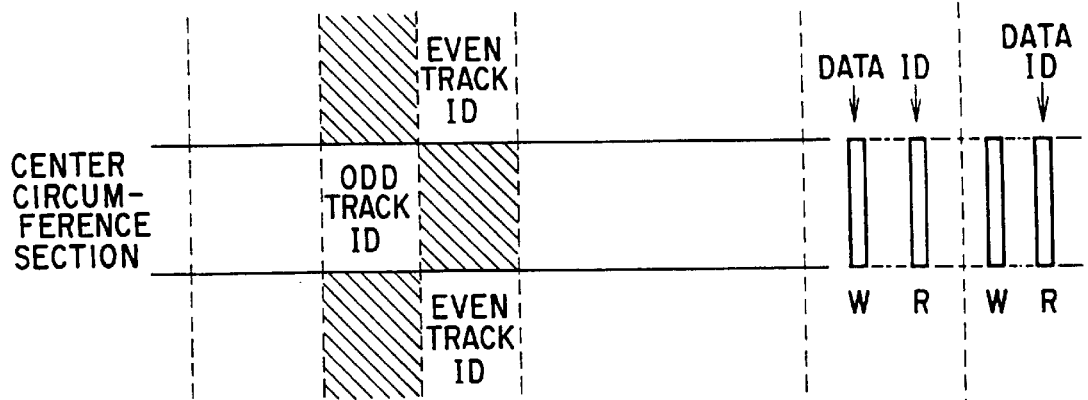
FIG. 16B
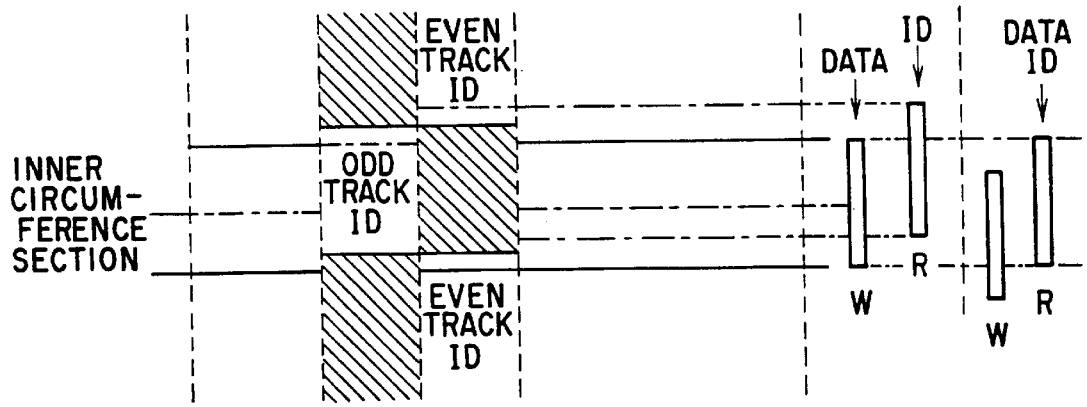
FIG. 16C
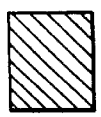 ·· ERASED AREA

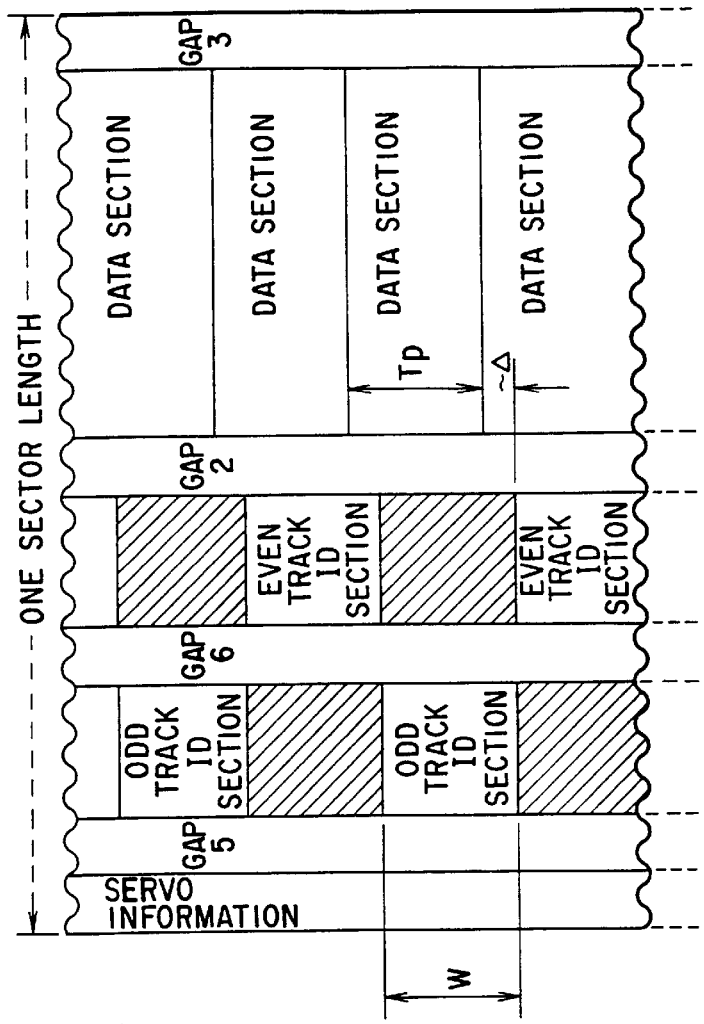
F I G. 17A
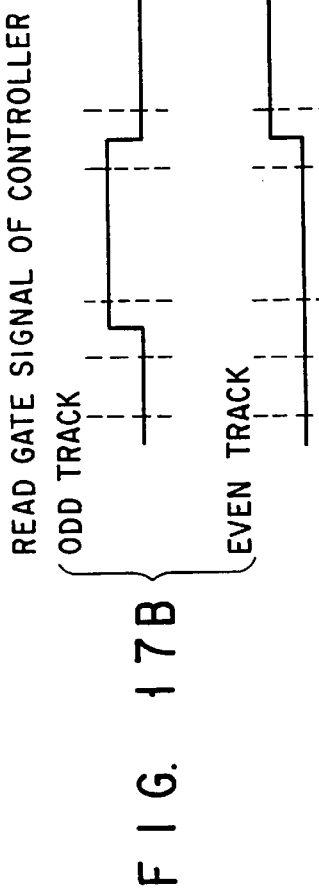
F I G. 17B

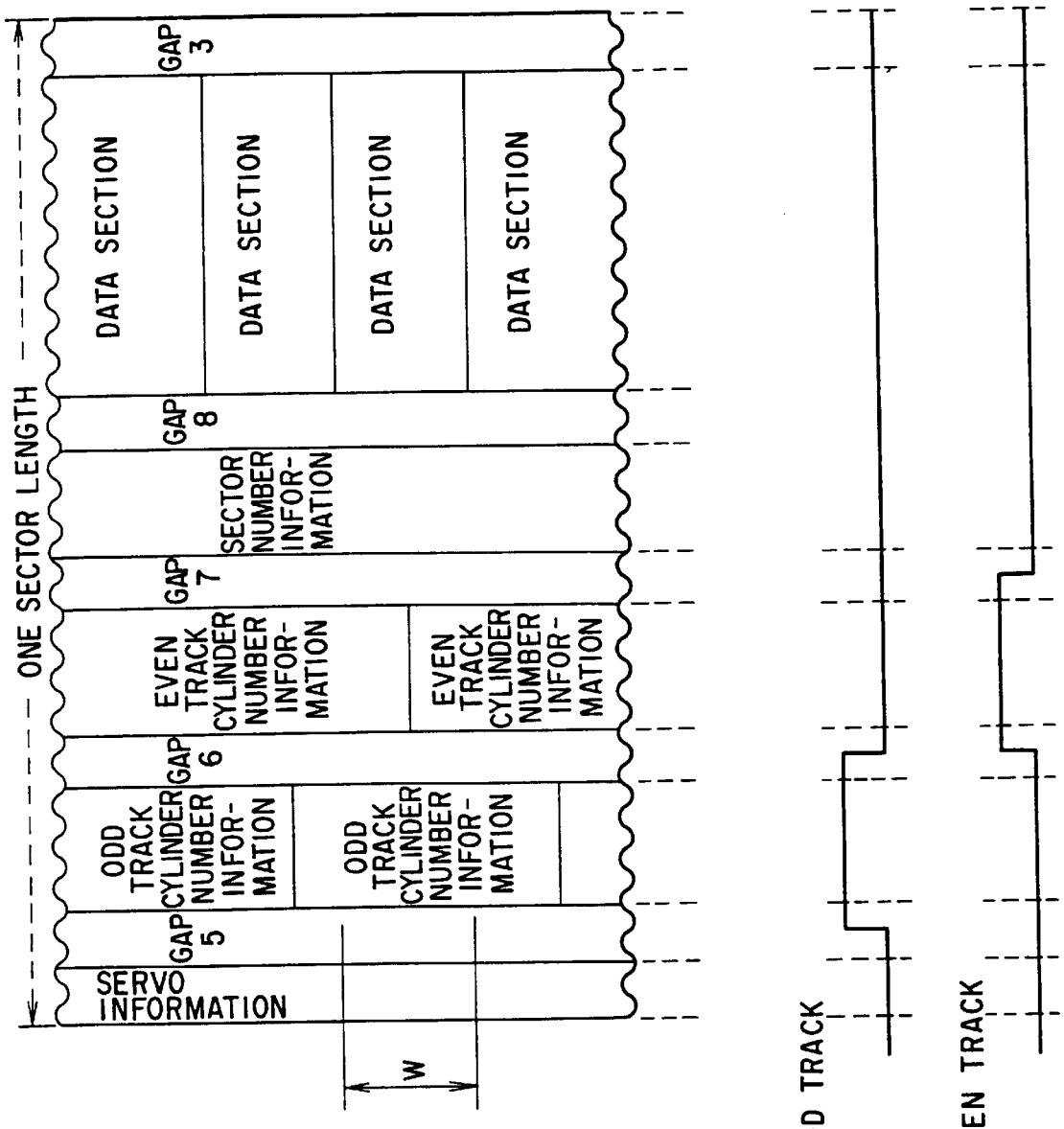
F I G. 20A
F I G. 20B

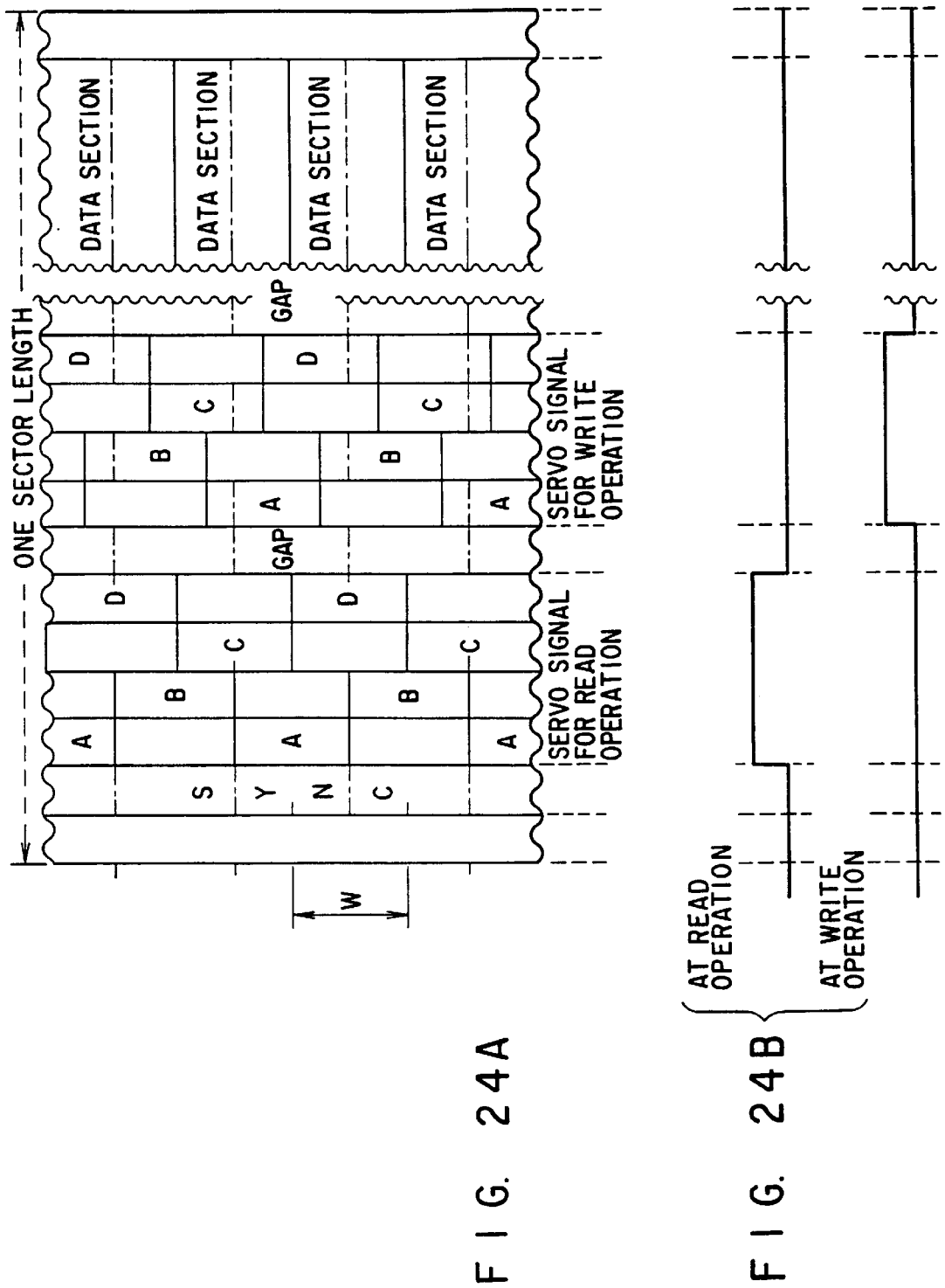

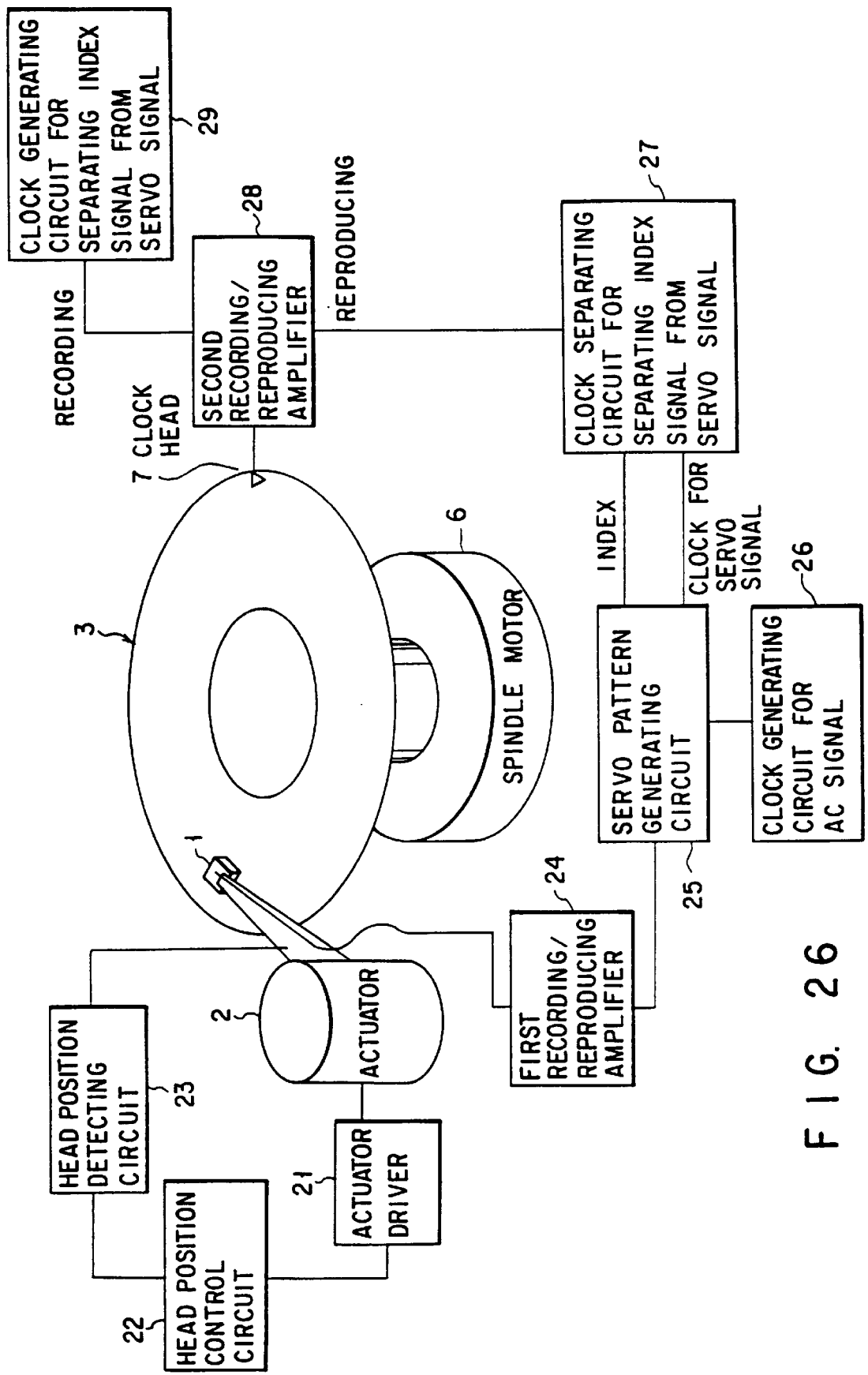
F I G. 26

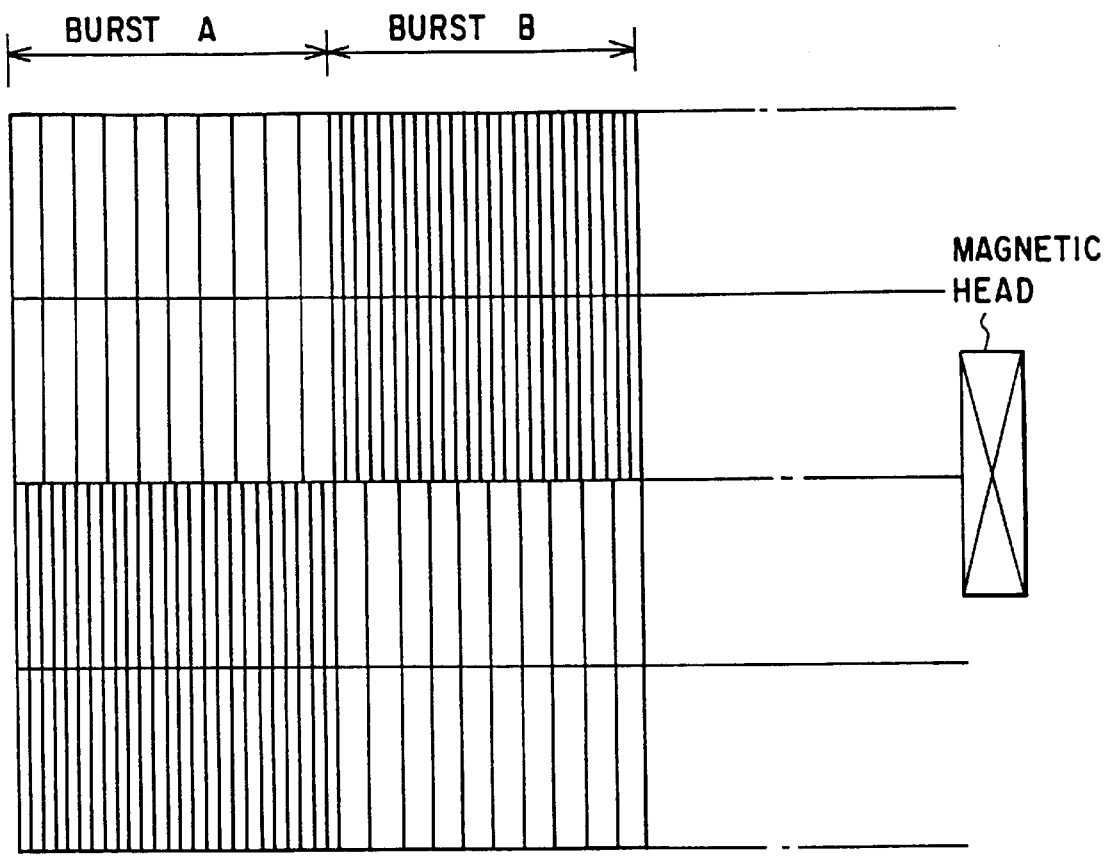
F I G. 28

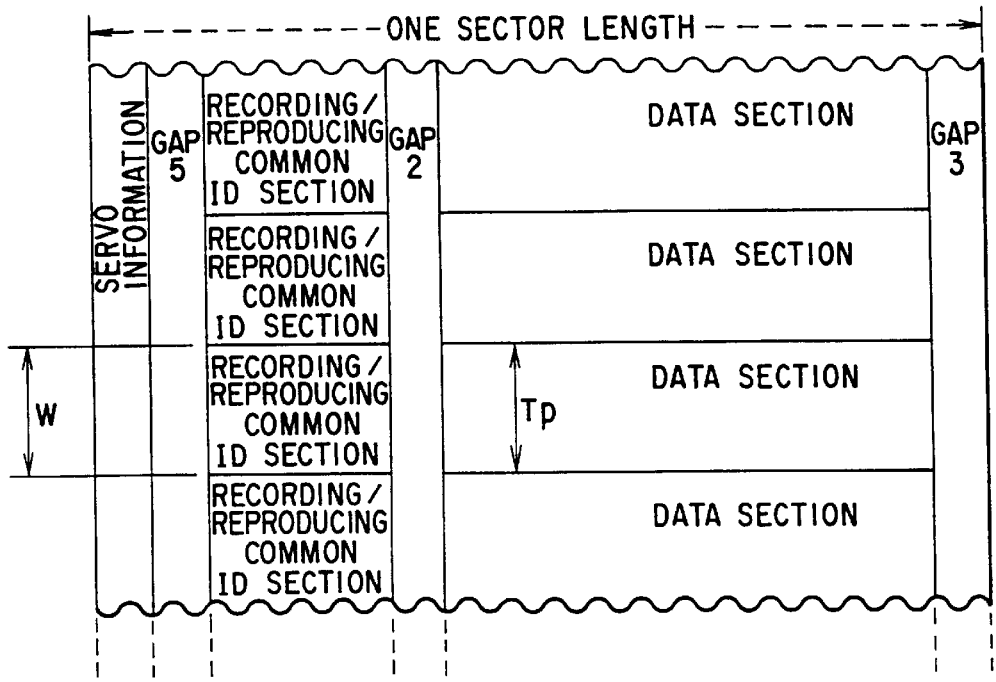
F I G. 34
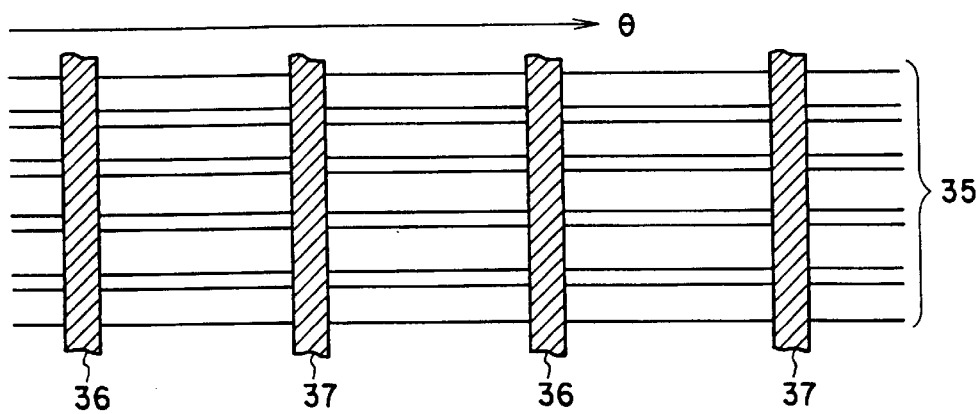
F I G. 35

MAGNETIC DISK DRIVE USING A NONVOLATILE SOLID STATE MEMORY TO STORE DEFECT INFORMATION

This application is a Continuation of application Ser. No. 08/299,667, filed on Sep. 2, 1994, now U.S. Pat. No. 5,786,957.

BACKGROUND OF THE INVENTION

1. Field of the Invention

The present invention relates to a disk drive such as a hard disk drive and a floppy disk drive using mainly a composite magnetic head with a thin film type wherein a write head and a read head are structured in a composite form.

2. Description of the Related Art

In the conventional magnetic disk drive, there is a disadvantage in which the performance of the recording and that of the reproducing cannot be suitably designed since recording and reproducing of signals are performed by the same head even if an access system of the head differs. As a technique for solving this problem, there is known a method for making the recording and the reproducing suitable independently by structuring the write head and the read head in a composite form. This type of the head is called as a composite head to distinguish from the conventional recording/reproducing common head.

A head which a magnetic force generating coil is combined into a ring-shaped core, which is designed such that a suitable signal recording can be performed as a recording head, is used (hereinafter called as an inductive head for convenience based on a reproducing principle through it is not suitable for a name of the write head). Also, an inductive head or a magnetoresistive head (hereinafter called as an MR head, and there is a case in which an MR head of composite type is simply called as an MR head) is used as a read head. Then, these heads are structured in a composite form (a case of the layer structure as in the thin film type is included), thereby the composite head is structured.

In consideration of the miniaturization of the future magnetic disk drive and inclination of high density thereof, it is desirable that there is used a composite head wherein there is provided such a head is superior to the conventional inductive head in sensitivity of reproducing, the MR head whose reproducing output has no relation with the relative speed of the head and the disk is used as a read head, and the read head and the write head of the inductive type are structured in a composite form.

In a small-sized disk drive, a rotary actuator is used since the structure is simpler than a linear actuator and there are advantages in terms of low cost, excellent vibration resistance, and low consumption of electric power, and so on (FIGS. 1A and 1B show one example of a magnetic disk drive of rotary actuator system).

The following explains a case in which the magnetic disk drive of the rotary actuator system using the composite head in which the write head and the read head are structured in a composite form (for example, a thin film magnetic head of composite type, which is structured by layering a thin film magnetic head of inductive type, serving as a write head, and MR head, serving as a read head). As shown in FIGS. 1A to 2, if the composite magnetic head is accessed in the range from an innermost track position to an outermost track by rotating an arm of the rotary actuator, misregistration is generated at a position of a recording track on the magnetic disk and a position of the read head by a skew angle θ. As shown in FIG. 2, an amount of track misregistration can be described by D·sinθ. D shows a space between a magnetic gap of the write head and that of the read head (FIG. 2 shows a case using the inductive head at both write and read operations, and central position of a reproducing element effect section is meant in the case of the MR head of FIGS. 1A and 1B, but hereinafter simply called as a magnetic gap as the similar meaning).

In the specification of the present invention, in order to visually easily understand the relationship between the head position and the magnetic disk rotating direction, as shown in FIG. 2, an area where the write head traces is called as a recording track, and an area where the read traces is called as a reproducing track. In contrast, an area on the magnetic disk for the recording/reproducing is originally performed is called a data track or simply as a track. In a case that the magnetic disk drive is structured in which the recording track and the reproducing track are conformed to each other when the positioning is performed at the central track (in a case that the width of the recording track and that of the reproducing track are different, the centers of both recording and reproducing tracks are conformed to each other, and in a case that the centers of both tracks deviate, an amount of misregistration is shown by a distance between both centers), the positional relationship between the recording track and reproducing track at each track position when the head is moved from the outermost circumference to the innermost circumference, and an inclination of the recording/reproducing gap are shown in FIGS. 3A to 3C. FIGS. 3A to 3C show the inclination of the recording/reproducing gap, and the gap therebetween is described wider than the actual case.

FIG. 4 shows an example of a format of the magnetic disk drive. At a head of each sector, there is provided an ID section where ID information of the sector (cylinder number, head number, presence or non-presence of defect depending, etc.) is recorded, it is needed that ID information be read before processing to a data area in any cases, that is, a case in which data is reproduced and a case in which data is recorded.

A mode is changed in order that the write head is on a data track at a write operation and the read head is on a data track at the write operation. In this case, if an offset amount of a voice coil motor (VCM) is finely adjusted so that a desired head flows the data track, the data section can be recorded/reproduced without deteriorating S/N. However, since the ID section is required to be read at both read and write operations, the following problem occurs. More specifically, it is extremely difficult to change the mode such that the write head is set to be on track after reproducing the ID section physically existing in the same sector by use of the reproducing head since the mode change must be instantaneously performed.

If the width of the recording head is sufficiently made wider to the width of the read head, the reproducing track can be surely included in the recording track. Due to this, ID information can be read without having deterioration of quality of a signal of the data section caused by the writing/reading head misregistration. However, this is not favorable in view of the point that a track density is increased.

"Track Density Constraints in the Application of MR Head Technology" IEEE TRANSACTION ON MAGNETICS, Vol. 28, No. 5, P. 2728, 1992 discloses the following two methods.

(1) The ID area and the data area are provided in a different physical sector; and (2) A plurality of ID (for reproducing and recording) is provided.

However, in the method (1), a through put of data access is lowered. In the method (2), though there is no description of the specific structure, it is described that the ID area is divided into odd tracks and even tracks, and a plurality of ID is provided.

FIG. 5 is a view showing an example having a plurality of ID areas. FIG. 6 is a view showing a method for recording a servo signal. According to FIG. 6, for example, servo information is written as shown by 1 to the final in accordance with head positions 1 to 5 at a servo write operation. Then, for example, the write head and the read head are controlled to be positioned to be at a center of the track at the write and read operations, respectively. According to FIG. 5, there is provided the structure in which each ID area to each track of the odd and even tracks is wider than the track, whereby ID information is correctly read. This structure is an effective method to solve the track misregistration. However, according to this method, since the servo write does not conform to the ID area of each track (that is, information is overwritten with a half pitch of the read head), it is required that ID information be written twice, and it takes much time to write ID information.

FIG. 7 is a view showing a general structure of the servo area.

Generally, the servo area has an address AGC area, an erased area, a track address code area, a burst AGC area, a positioning data area, and a gap section. The address AGC area controls a gain of an auto gain control (AGC) amplifier so as to standardize amplitude of a reproduced signal, and ensures the detection of the sequential erased area and the reproduction of the track address code area. The erased area recognizes the start of the servo area. An address in which the head exists is allotted to the track address code area. The burst AGC area adjusts the gain of the AGC amplifier so as to ensure extraction of positioning information from burst pattern data of the sequential positioning data area. The gap section absorbs of rotation jitter of the magnetic disk.

Generally, as shown in FIG. 8, the positioning data area of the hard disk drive in which the conventional inductive head is provided has a plurality of burst areas (in this example, A, B, C and D areas). In each burst area, a burst signal area where continuous data is recorded with the width Tp of the track pitch and an area erased in a DC manner are alternately provided in a direction of the width of the track. That is, the burst signal area and the erased area are provided as deviating in the width direction of the track.

A dash and dotted line of FIG. 8 shows a center of each center. In order to position the magnetic head at the center of the track, the position of the magnetic head is controlled such that a value of (a−b)/(a+b) is set to 0 from amplitude a of the reproduced signal sent from the burst area A and amplitude b of the reproduced signal sent from the burst area B.

The burst areas C and D are recorded a position at which differs a half pitch from the burst A and the burst B to obtain a good linearity even in a case that the magnetic head is presented in an area where the magnetic head crosses the adjacent two tracks (i.e., in a case of head position having wrong linearity obtained from position information generated by the signals of the burst A and the burst B).

In order to form the above-mentioned positioning data area, as shown in FIGS. 9A to 9C, the recording of the positioning data area is performed by feeding the magnetic head by a half of the track pitch Tp, and overwriting information on a base recording before the movement of the head to a portion, and adjusting the phases.

In the case that the positioning data area is recorded by use of the inductive recording MR reproducing composite head (hereinafter, referred to as a composite MR head), there is known that an edge bipolar charge directing in a direction of the width of the track is generated at both sides of the recording track. The similar phenomenon is generated when a DC erase is performed as shown FIG. 10A. FIG. 10B shows the structure of the write head section of the composite MR head. The magnetic gap is formed by a lower pole of the reproducing side and the upper pole of trailing side. In reproduction using the composite MR head, if the magnetic flux sent from the edge bipolar charge is fetched to the MR film of the MR head, there is a problem in which offset is generated in the reproduced signal in a DC manner.

According to the same method as the case using the conventional inductive head, as shown in FIG. 11A, in a case that the edge bipolar charge appears in the portion overwritten by the DC erase of positioning data, and the edge bipolar charge is reproduced by the composite MR head so as to obtain head positioning information, since the MR head obtains the reproduced signal at the position where the MR head crosses the edge of the burst area, the MR head is subjected to influence of the edge bipolar charge. Due to this, the reproduced signal of head positioning information has offset in the DC manner every burst area shown FIG. 11B.

SUMMARY OF THE INVENTION

An object of the present invention is to provide a magnetic disk drive in which ID information can be stably read from a magnetic disk at write and read operations with high reliability.

According to a first aspect of the present invention, there is provided a magnetic head drive comprising: a composite magnetic head structured by integrally combining a write head into a record head; and a magnetic disk having a servo area where position information of the composite magnetic head is recorded and a data area where data is recorded, wherein the servo area includes a positioning data area having head positioning information, and the magnetic composite head has an erased area generated by recording an AC signal having a frequency higher than a burst pattern in an area other than The burst pattern including information of positioning the composite magnetic head of the positioning data area. Particularly, the magnetic disk drive of the present invention further comprises head tracking servo means for providing a positioning offset to the composite magnetic head such that the write head is set to be on-track in the data area of the magnetic disk at a write operation and the read head is set to be on-track state in data area of the magnetic disk at a read operation.

According the first aspect of the present invention, in a case that a servo pattern is reproduced by use of an MR head is used, it is possible to avoid generating offset in a DC form at a read operation of head positioning information of head positioning data, thereby making it possible to realize a correct positioning.

Moreover, according to the first aspect of the present invention, the AC signal having a frequency higher than the burst pattern is recorded in an area, which is conventionally DC-erased, in positioning data, thereby making it possible to prevent from appearance of an edge bipolar charge and prevent from generation of DC-offset of the reproduced signal of head positioning information.

In the above-mentioned structure, the magnetic disk drive of the present invention further comprises a rotary actuator mounting the magnetic head on its one end and rotatable around another end, wherein the magnetic disk further includes first ID information recorded at a position where the read head is set to be on-track state at the data read operation and second ID information recorded at a position where the read head is set to be on-track state at the data write operation.

In order that the write head is set to be on-track in the data area at the write operation and the read head is set to be on-track in the data area at the read operation, positioning offset is provided to the magnetic head. Also, there are provided first ID information recorded at a position where the read head is set to be on-track state at the data read operation and second ID information recorded at a position where the read head is set to be on-track state at the data write operation. Whereby, since the ID section can be reproduced in a state that the read head is on-track at any cases, information of the ID section can be stably read at both write and read operations.

Moreover, in the above-mentioned structure, the magnetic disk drive further comprises a rotary actuator mounting the magnetic head on its one end and rotatable around other end, wherein the magnetic disk further includes an ID area having first ID information read by the read head at the data read operation and second ID information, recorded at a format different from the first ID information, read by the write head at the data write operation.

In order that the write head is set to be on-track in the data area at the write operation and the read head is set to be on-track in the data area at the read operation, positioning offset is provided to the magnetic head. Also, first ID information, which is recorded by the format suitable for reproducing by use of the read head, is read at the data read operation in a state that the read head is on-track, and second ID information, which is recorded by the format suitable for reproducing by use of the write head, is read at the data write operation in a state that the write head is on-track. Whereby, information of the ID section can be stably read at both write and read operations.

Furthermore, in the above-mentioned structure, the magnetic disk drive of the present invention further comprises a rotary actuator mounting the composite magnetic head on its one end and rotatable around other end, wherein the magnetic disk further includes an ID area recorded at a recording density different from the data area such that data is read by the read head at the data read operation and data is read by the write head at the data write operation.

In order that the write head is set to be on-track in the data area at the write operation and the read head is set to be on-track in the data area at the read operation, positioning offset is provided to the magnetic head. Also, ID information, which is recorded with relatively low record density as compared with the data area and can be read by any of the read and write heads, is read by the read head at the read operation in a state that the read head is on-track and by the write head at the write operation in a state that the write head is on-track. Whereby, information of the ID section can be stably read at both write and read operations.

According to a second aspect of the present invention, there is provided a magnetic disk drive comprising: a rotary actuator; a rotary actuator arm having a first end mounting the composite magnetic head thereon and a second end connected to the rotary actuator; a composite magnetic head, mounted on other end of the rotary actuator arm, and structured by integrally combining a write head into a read head; a magnetic disk having a servo area where positioning information of the composite magnetic head is recorded and an ID area where ID information of a sector is recorded, the ID area including a first ID area where a plurality of odd track ID areas are continuously formed and a second ID area where a plurality of even track ID areas are continuously formed; and head tracking servo means for providing a positioning offset to the composite magnetic head such that the write head is set to be on-track in the data area of the magnetic disk at a write operation and the read head is set to be on-track state in data area of the magnetic disk at a read operation; wherein the servo tracking servo means includes means for setting a width of each of the odd track ID areas and that of each of the even track ID areas to an integral multiple of a pitch width for servo positioning of the composite magnetic head recorded in the servo area.

According to the second aspect of the present invention, the ID area is divided into two areas of odd and even tracks, and the width of each of the ID area is set to an integral multiple of a pitch width of the servo positioning of the magnetic head. Due to this, since it is not needed that ID information be overwritten with a half pitch of the write head, time for recording ID information can be shortened.

According to a third aspect of the present invention, there is provided a magnetic disk drive comprising: a rotary actuator; a rotary actuator arm having a first end mounting the composite magnetic head thereon and a second end connected to the rotary actuator; a composite magnetic head, mounted on other end of the rotary actuator arm, and structured by integrally combining a write head into a read head; a magnetic disk having an ID area where ID information of a sector is recorded; and head tracking servo means for providing a positioning offset to the composite magnetic head such that the write head is set to be on-track in the data area of the magnetic disk at a write operation and the read head is set to be ontrack state in data area of the magnetic disk at a read operation; wherein the ID area of the magnetic disk includes a first ID area where an area recording ID information of an odd number track and an erased area erasing information are alternately recorded and a second ID area where an area recording ID information of the plurality of even number tracks and an erased area erasing information are alternately recorded.

In the above third aspect of the present invention, positioning offset is provided to the magnetic head in order that the write head is set to be on-track in the data area at the write operation and the read head is set to be on-track in the data area at the read operation. Also, the record positions of ID information on the odd number track and even number track are recorded based on the relation of the phase different from each other, and both sides of the area where ID information is recorded is an erased area. Due to this, a noise component cannot be read from the adjacent tracks even if the ID section is read at the recording mode in a state that the read head is on-track. Whereby, information of the ID section can be stably read at both write and read operations.

According to a fourth aspect of the present invention, there is provided a magnetic disk drive comprising: a rotary actuator; a rotary actuator arm having a first end mounting the composite magnetic head thereon and a second end connected to the rotary actuator; a composite magnetic head, mounted on other end of the rotary actuator arm, and structured by integrally combining a write head into a read head; a magnetic disk having an area where cylinder number information is recorded, an area where sector number information is recorded, a servo area where servo information is recorded, and a data area where data is recorded; head tracking servo means for providing a positioning offset to the composite magnetic head such that the write head is set to be on-track in the data area of the magnetic disk at a write operation and the read head is set to be on-track state in data area of the magnetic disk at a read operation; and storing means for storing a defect sector of the magnetic disk and defect information of a defect track. At least one of the cylinder number information and sector number information is recorded with a width equal to or larger than a track pitch. The cylinder number information is recorded in a different phase each other in accordance is with a remainder obtained when the cylinder number is divided by n (n: 2 or more natural number). The magnetic disk has an area recording first cylinder information recorded at a position where the read head is on-track at the read operation, second cylinder information recorded at a position where the read head is on-track at the data write operation, and sector number information recorded at a forward portion of each data sector with a width at least equal to or larger than a track pitch. The read head reads the servo information, and the servo information includes first servo information recorded such that the write head is set to be on-track in the data area at the write operation, and second servo information recorded such that the read head is set to be on-track in the data area at the read operation.

According to the fourth aspect of the present invention, there is provided head tracking servo means for positioning the magnetic head such that the write head is set to be on-track in the data area of the magnetic disk at a write operation and the read head is set to be on-track state in data area of magnetic disk at a read operation. Moreover, there is provided an area where cylinder number information is recorded to be close to an area where servo information is recorded, so that the cylinder number can be detected and confirmed. Furthermore, there is provided an area where sector number information is recorded at the forward portion of each data sector, so that the sector number can be confirmed before recording and reproducing.

Moreover, in order to store the defect sector on the disk and defect track information into a specific memory on the magnetic disk or a nonvolatile solid memory, the defect sector and defect track information are read at the time of staring the device, thereby making it possible to confirm whether the sector to be accessed is a defect sector nor not beforehand without accessing. The head number does not have to be written to the ID section if a physical head number and a logical head number are the same. In some magnetic disk drives, there is a case that the logical head number seen from the outer unit, the cylinder number and the sector number are different from the logical head number, the cylinder number and the sector number, which are recorded on the disk. This case can be dealt by providing an allocation table is to a suitable memory. Therefore, the head number can be confirmed without recording it to the ID section. In other words, the ID section can be omitted.

In the above-mentioned structure of the first to fourth aspects of the present invention, in a case that there is used a magnetic disk in which servo information for positioning the head including position error information is recorded on a data surface, the following points can be provided.

The magnetic disk alternately and dispersively records first servo information corresponding to the read head and second servo information corresponding to the write head, and the head tracking servo means includes means for positioning the composite magnetic disk based on position information obtained by synthesizing first position information obtained by cutting a low frequency component including a DC component from first and second position error information showing position errors of the read and write heads alternately obtained from first and second servo information read from the magnetic disk by the head with second position information obtained by selecting first position error information at the read operation and second position error information at the recording time, respectively.

Discrimination information for discriminating whether servo information is first servo information or second servo information is preferably included in first and second servo information recorded in the magnetic disk.

If a sampling frequency is set to Fs and n is set to an integer number $(0, 1, 2, \ldots)$, the above first position error signal is a signal in which a misregistration is generated by displacement of a complementary angle in only the frequency of $n \cdot Fs/2$, and an error is included. If n is an even number equal to or more than 2, since the frequency component passes through a Zero-order holding circuit and its output becomes a zero output, the frequency component does not appear. Also, regarding the frequency component wherein n is an odd number, since the level is reduced as n becomes larger due to a low pass filter characteristic of the Zero-order holding circuit, such a frequency component can be ignored. However, the frequency component is Fs/2 when n=1, and the frequency having such a frequency component cannot be ignored. Due to this, first and second position error information is cut by the band rejection filter of a narrow band frequency for cutting the component of Fs/2. The frequency of this filter is fixed, this filter has little influence on other frequencies having a narrow band. In this case, n=0 shows a direct current component. However, since an error is included in the direct current component, a low frequency component including DC component is cut from first and second position error information, and the obtained information is used as first position information.

On the other hand, first and second position error information is respectively selected in accordance with the reproducing or the recording, so that the selected information is used as second position signal. A sampling rate of second position information is Fs/2, and the frequency band is a half of the band frequency of first position information, but the band frequency is correct, and includes no error. However, since the band frequency of second position information is narrow, phase distortion is generated in an area where the frequency is high. In order to avoid the generation of phase distortion, it is preferable that only the low frequency portion is extracted through the low pass filter.

The above obtained first position information including no DC component and second position information having a small amount of AC component are synthesized to form third position information, thereby obtaining substantially complete position information. The above-obtained third position information has no component of Fs/2. However, since third position information is substantially the same as position information of the sampling rate Fs, the phase distortion is low up to the high frequency. Therefore, the head tracking servo system for positioning the composite magnetic head is structured by use of the above-obtained third position signal, whereby the trace of the read head is precisely conformed to the that of the write head, so that there can be realized the magnetic disk drive in which the record tracks are arranged with high density.

In the structure of the first of fourth aspects of the present invention, the head tracking servo means preferably includes a band rejection filter for cutting a frequency component of a ½ sampling rate from first position information. Also, head tracking servo means preferably includes a low pass filter for cutting a high frequency component of second position information. Moreover, a Zero-order holding circuit for inputting position error information is preferably provided.

As mentioned above, according to the present invention, in the magnetic disk of the rotary actuator system on which the composite magnetic disk having the writing/reading heads in the composite form is mounted, since ID information by the format improved to be suitable for the composite head is provided, ID information can be surely read even if there is misregistration in the recording track/reproducing track. Also, ID information can be surely read even if the read head is in an off-track state to the reproducing track at not only the read operation but also the write operation. Therefore, the record track density can be expected to be largely improved as compared with the prior art.

Moreover, according to the present invention, in the magnetic disk of the rotary actuator system on which the composite magnetic disk having the writing/reading heads in the composite form is mounted, since cylinder number information and sector number information by the format improved to be suitable for the composite head are provided, these informations can be surely read even if there is misregistration in the recording track/reproducing track. Also, these informations can be surely read even if the read head is in an off-track state to the reproducing track at not only the read operation but also the write operation. Therefore, the recording track density can be expected to be largely improved as compared with the prior art, and format efficiency of data can be improved.

In addition, since a part of conditions necessary for confirming ID information can be written in recording servo information, there can be obtained an advantage in which the number of times of servo-disk formatting and the total sum of time can be reduced. This advantage is extremely helpful in realizing the high density magnetic disk drive on which the composite magnetic head is mounted.

Moreover, according to the present invention, in the magnetic disk of the rotary actuator system on which the composite magnetic disk having the writing/reading heads in the composite form is mounted, the composite magnetic head is positioned at a different position at each of the read and write operations, and the read head and the write head are positioned at the same trace at the read and write operations. Whereby, there can be provided the magnetic disk drive with high record density without narrowing an effective track width.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a view showing a general structure of a servo area;

FIGS. 9A to 9C are views showing a state where the positioning data area is formed;

FIGS. 12A to 12C are views showing a first embodiment of the present invention;

FIGS. 14A to 14C are views showing a first modification of the first embodiment of the present invention;

FIGS. 15A and 15B are views showing an ID section of the first modification of the first embodiment of the present invention;

FIGS. 16A to 16C are views showing a second modification of the first embodiment of the present invention;

FIGS. 17A and 17B are views showing an ID section of the second modification of the first embodiment of the present invention;

FIGS. 20A and 20B are views showing the details of a cylinder number of the first specific example, and a sector number portion;

FIGS. 24A and 24B are showing a cylinder number portion of the third specific example of the second embodiment of the present invention;

FIG. 26 is a block diagram for recording a servo pattern of a fourth embodiment of the present invention;

FIG. 28 shows one example of a recording pattern of a burst portion A of the present invention and that of a burst portion B;

FIG. 34 are a view showing an ID section of the seventh embodiment of the present invention;

FIG. 35 is an arrangement plane of servo information on the magnetic disk of an eighth embodiment of the present invention;

DETAILED DESCRIPTION OF THE PREFERRED EMBODIMENTS

Embodiments of the present invention will be explained with reference to the drawings.

A magnetic disk drive of a first embodiment of the present invention will be explained with reference to FIGS. 12A to 13B.

In a case that a composite magnetic head in which a write head and a read head are structured in a composite form is applied to a magnetic disk drive of a rotary actuator system, if the composite head is moved from an inner circumference to an outer circumference by a rotation of the rotary actuator, each of the write head W and the read head R generates a positional misregistration at a respective track area as shown in FIGS. 12A to 12C.

Figure 1A:
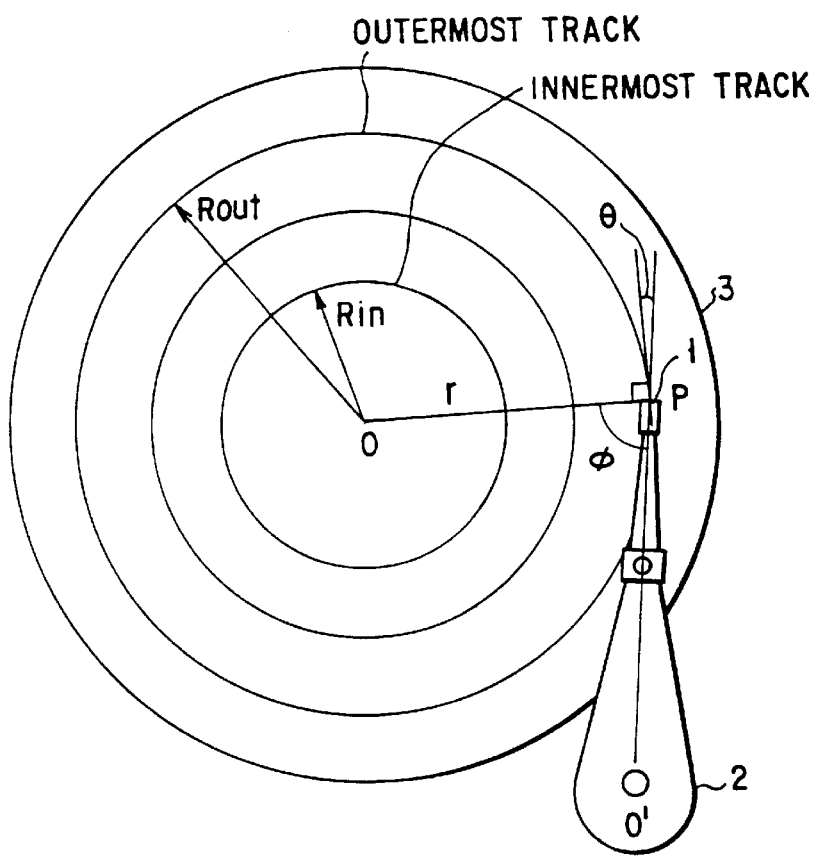
FIGS. 1A and 1B are views showing one example of a magnetic disk drive on which a rotary actuator is mounted.
Figure 1B:
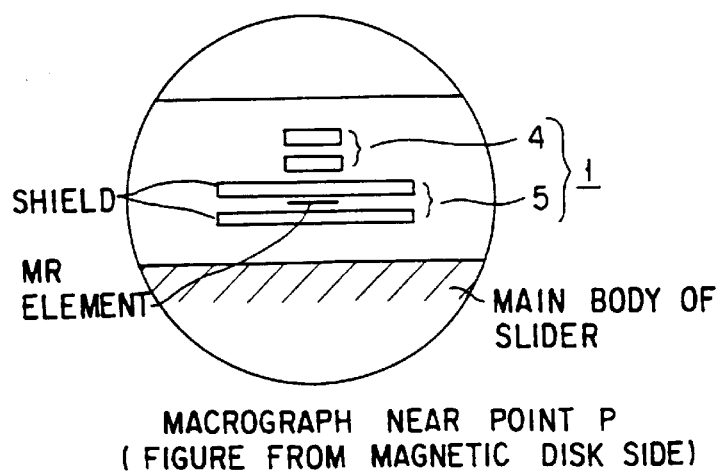
Figure 2:
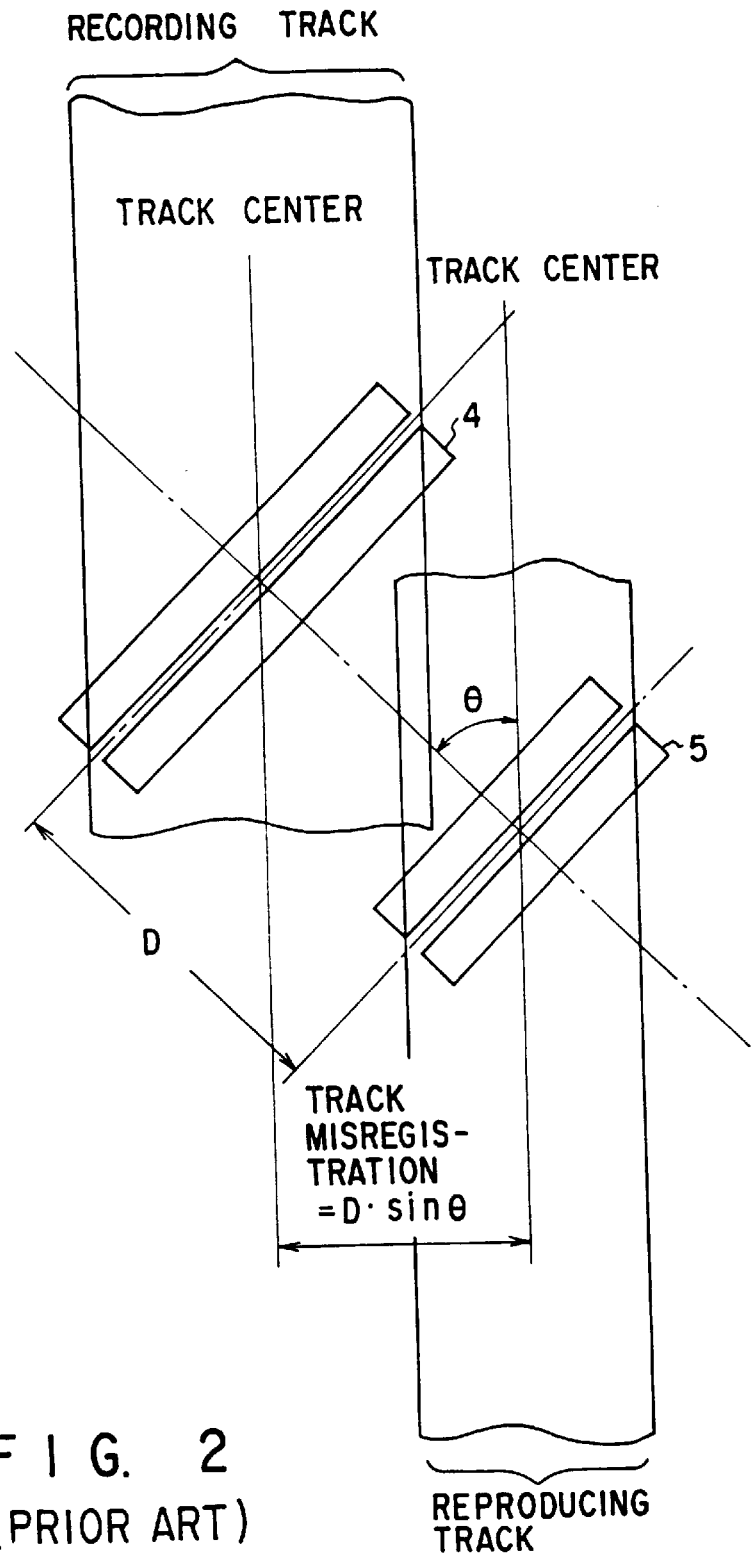
FIG. 2 is a view for explaining a track misregistration based on a skew angle.
Figure 3A:
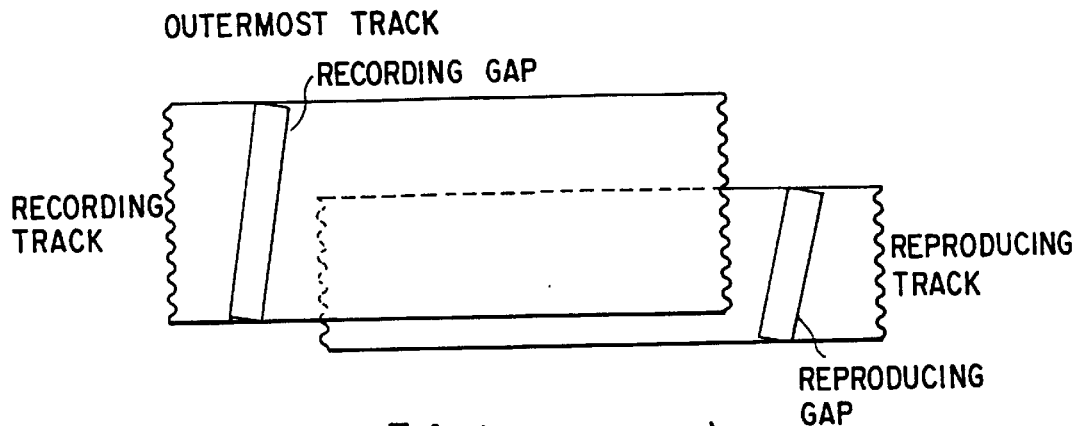
FIGS. 3A to 3C are views showing recording and reproducing track misregistrations at each track position.
Figure 3B:
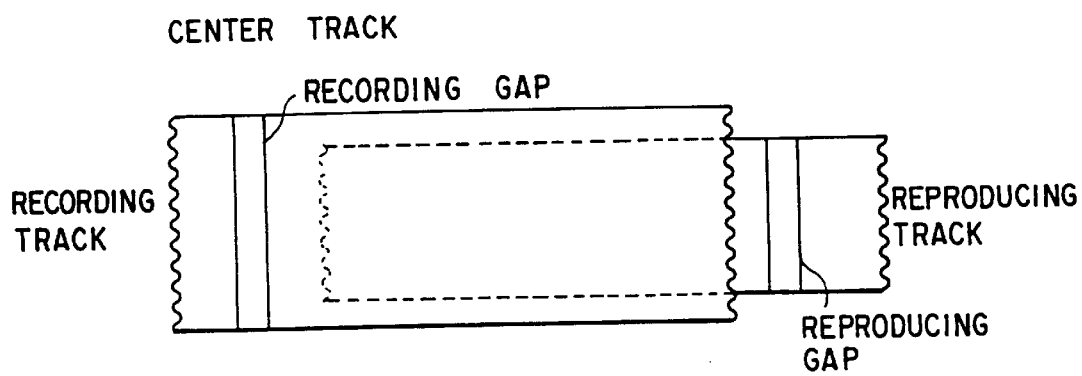
Figure 3C:
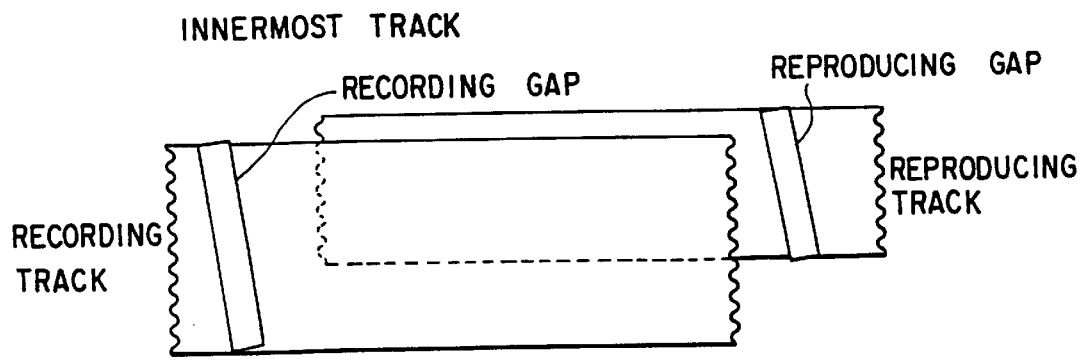
Figure 4:
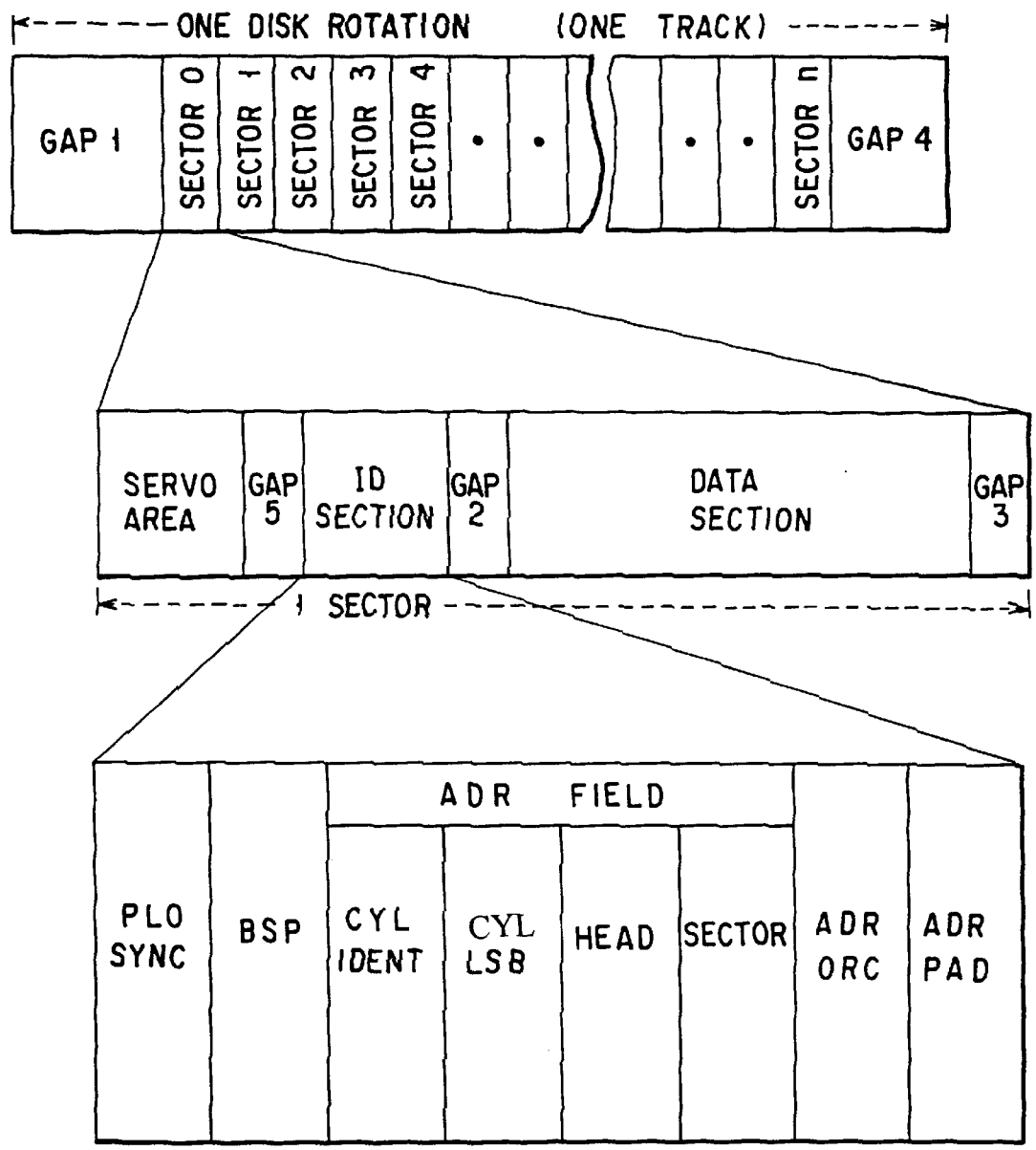
FIG. 4 is a view showing one example of a magnetic disk format.
Figure 5:
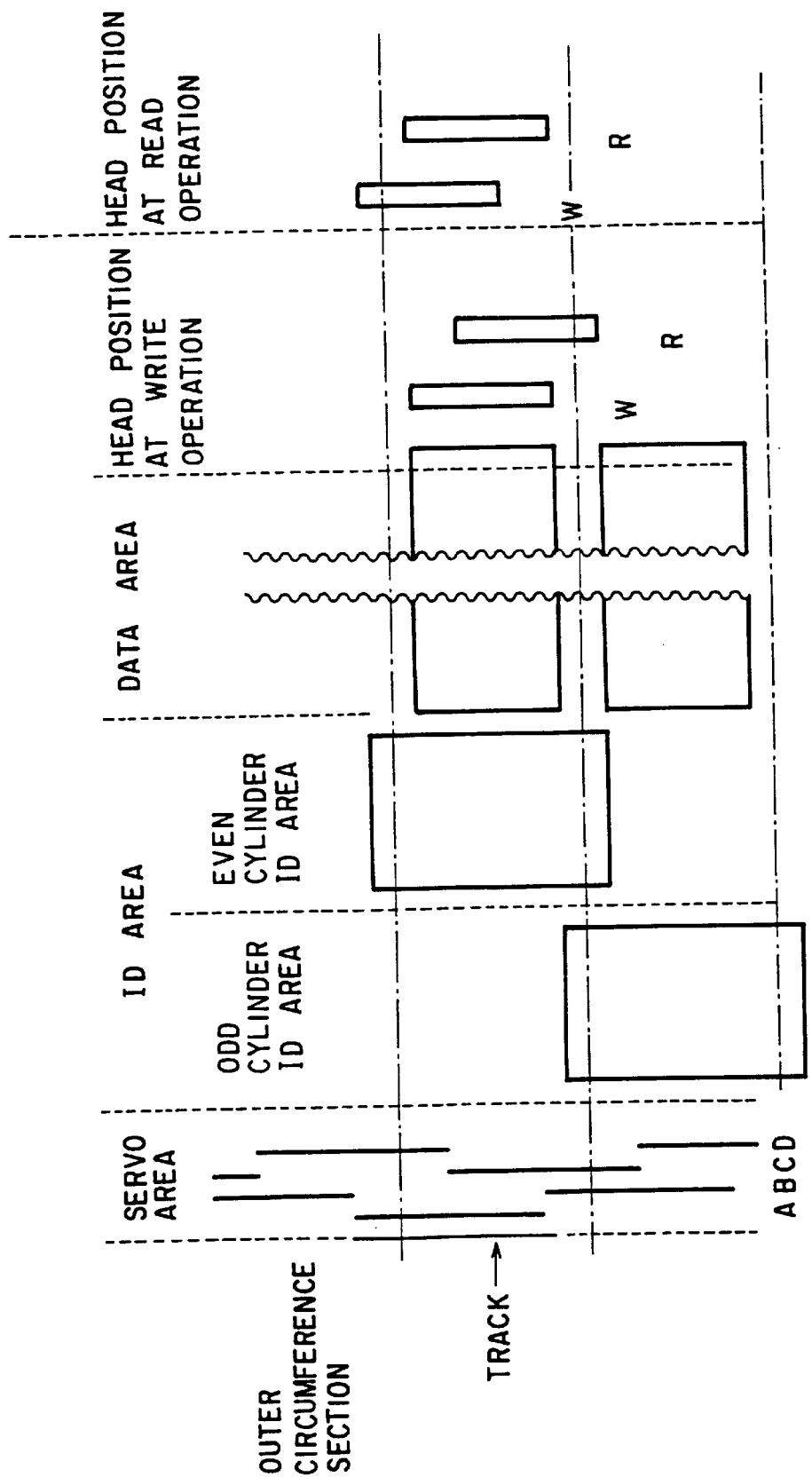
FIG. 5 is a view showing an example having a plurality of ID areas.
Figure 6:
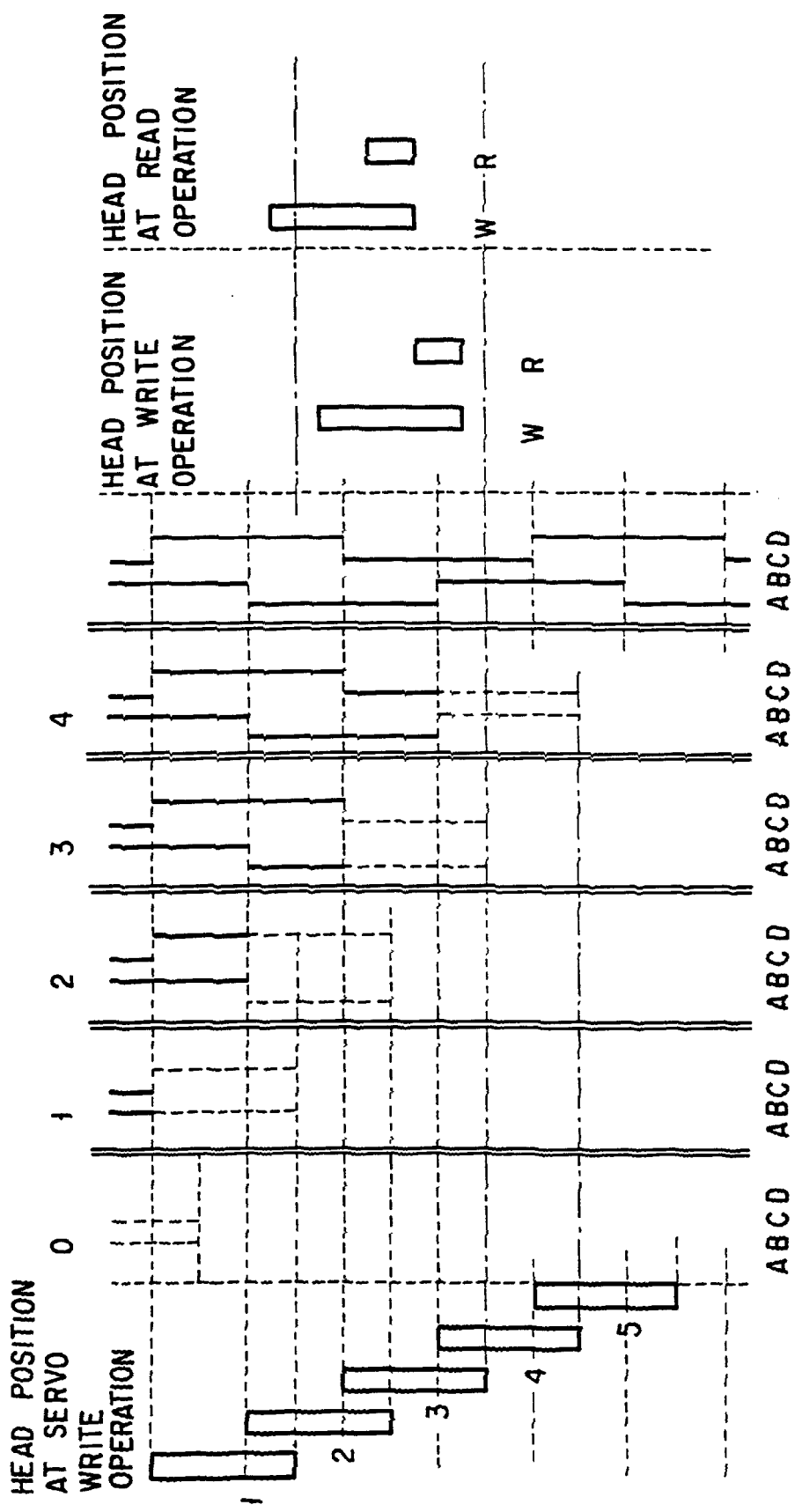
FIG. 6 is a view showing a recording method of a servo signal.
Figure 8:
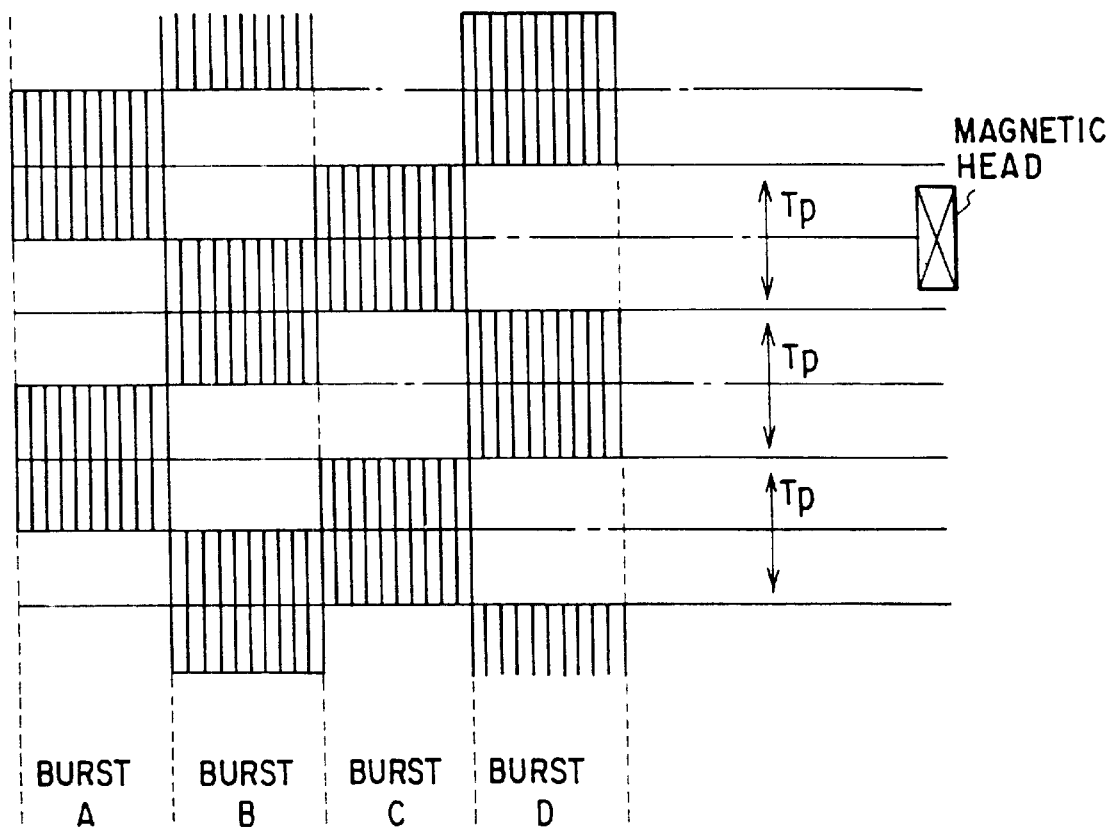
FIG. 8 is a view showing a positioning data area of a hard disk drive having an inductive head.
Figures 10A, 10B:
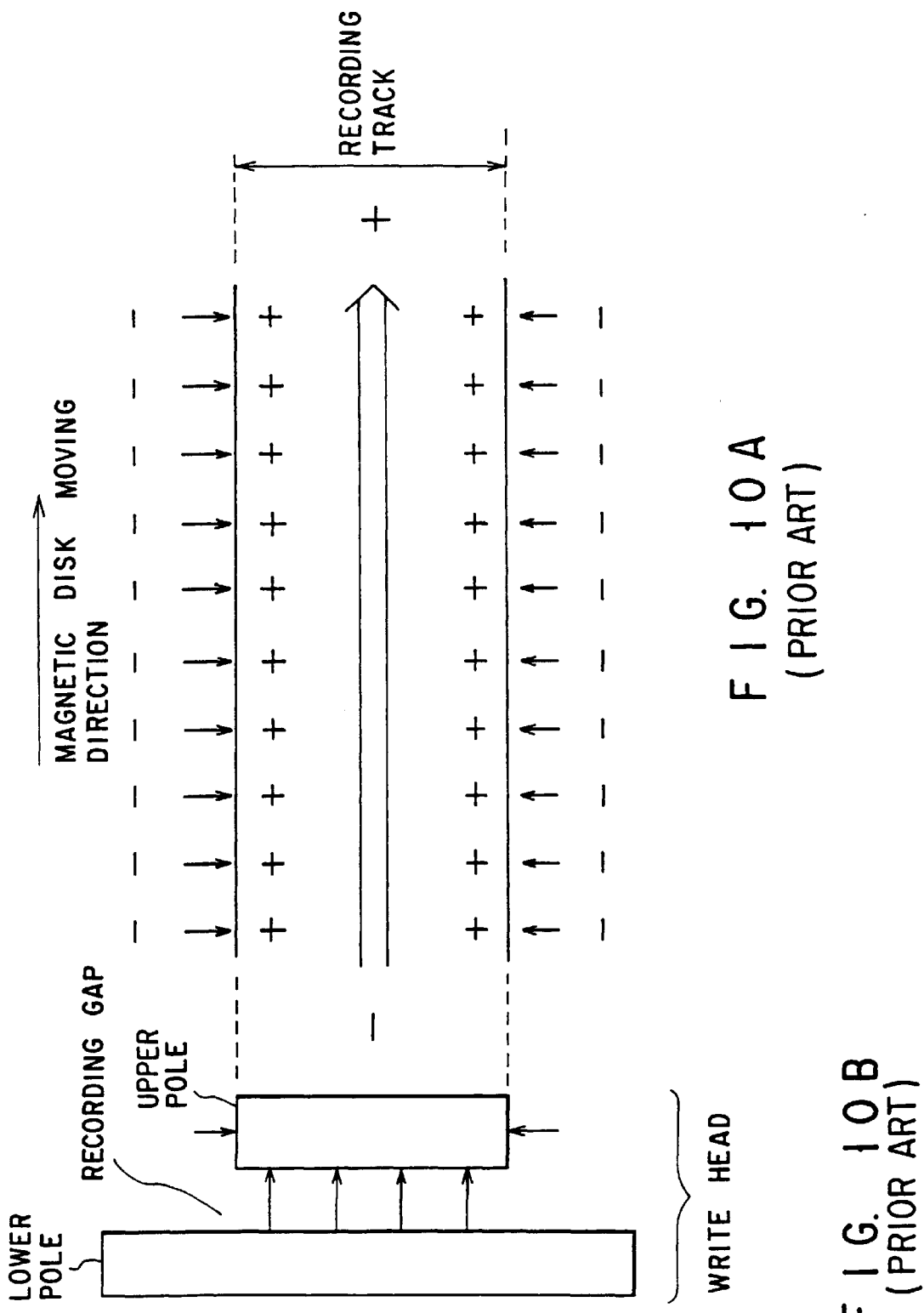
FIGS. 10A and 10B are views showing a state where the positioning data area is recorded by use of a composite MR head.
Figures 11A, 11B:
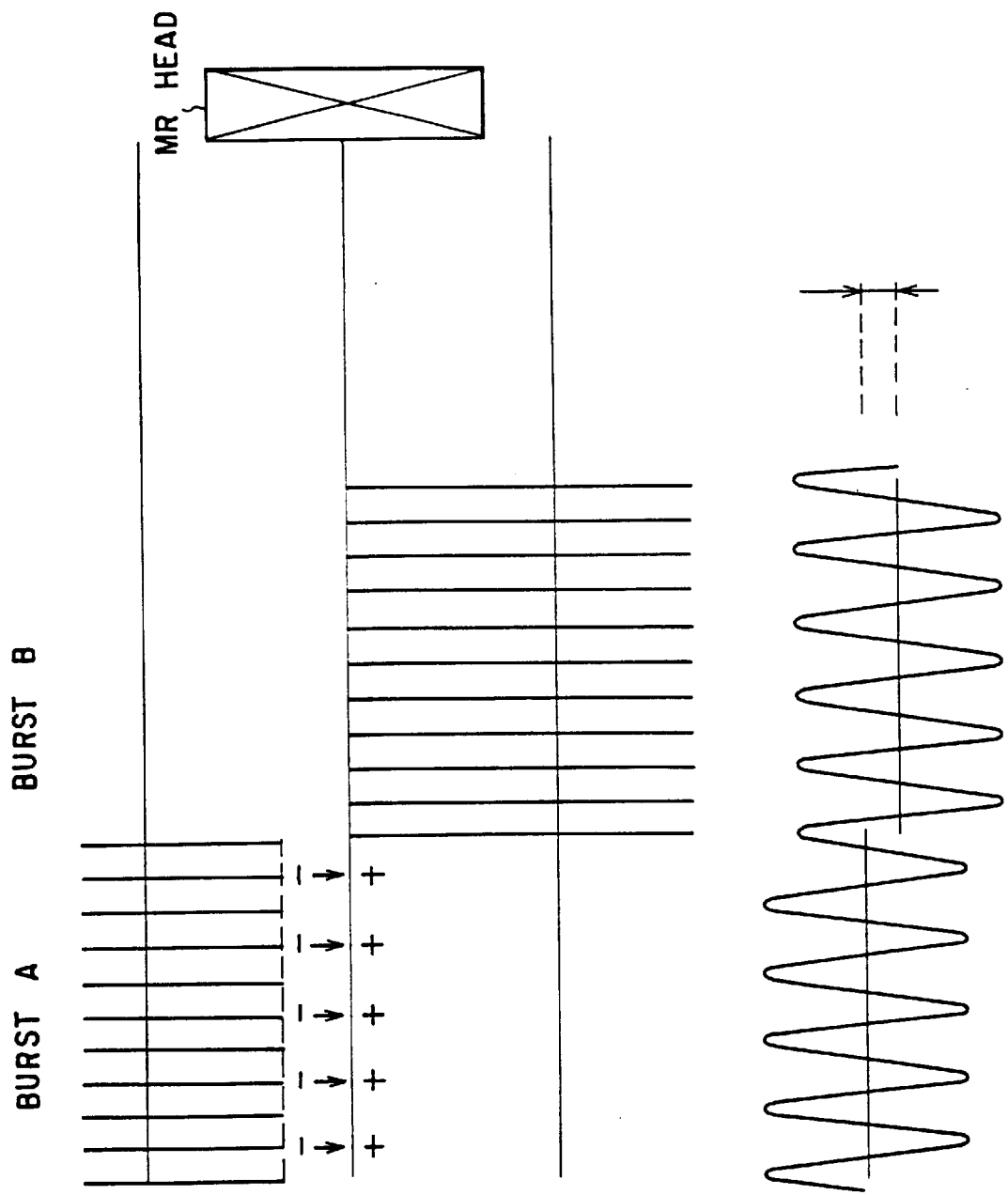
FIGS. 11A and 11B are views explaining a defect of a DC erase.

In view of the design of the system, it is common to set the size of the track width and a guard band to a preferable relation. In this case, for simplifying the explanation, track pitch, the write head and the write head are drawn with the same width (the same in the following figures). In actual, as shown in FIGS. 3A to 3C, the head is inclined to a track direction (disk rotating direction). This is also omitted to simplify the explanation (the same in the following figures).

FIGS. 12A to 12C show the positional relationship between an ID area format and the head in odd tracks of each of an outer circumference section, a center circumference section, and an inner circumference section. In order that the write head is set to be on-track in the data area of the magnetic disk at a write operation and the read head is set to be on-tack state in data area of the magnetic disk at a read operation, a positioning offset is provided to the magnetic head, thereby making it possible to perform read/write operations in the data area. In this case, the read head reads information of an ID section in an off-track state at the recording mode. According to the present invention, since both sides of the ID section are an erased area, and there is no case in which a noise component is read from the adjacent tracks. Therefore, according to the present invention, information of the ID section can be stably read at both write and read operations. In the present invention, since both sides of the ID section are erased, deterioration of quality of the signal of ID information is lenient in a case that the head is off-track by various types of noise and disturbance. Due to this, the present invention has an advantage in which an off-track margin is larger than a conventional method in which data is recorded in the adjacent tracks.

Figures 13A, 13B:
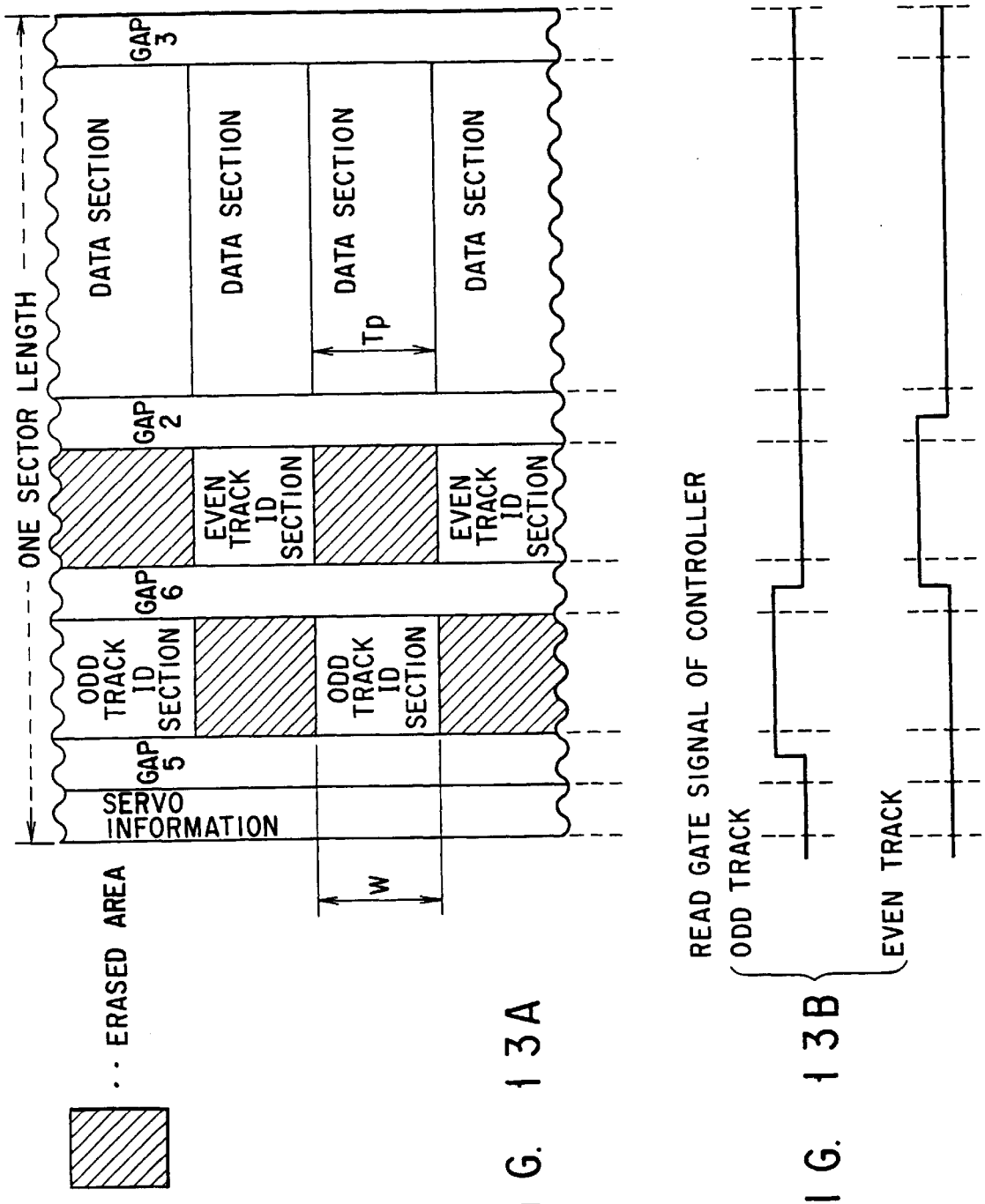
FIGS. 13A and 13B are views showing an ID section of the first embodiment of the present invention.

FIGS. 13A and 13B show one example of a format of the ID section of this embodiment together with a read gate signal of a controller for reproducing ID data. In this embodiment, since the recording positions of ID information in odd number tracks and even number tracks are recorded in a different phase relation, timing for reproducing ID information is changed at each of the odd tracks and the even tracks. A GAP 6 for changing various kinds of gate signals is provided as required. A width (W) recording ID information is equal to a record width (Tp: the same as the track pitch since the guard band is omitted in this case) in the data area.

The both sides of the area where ID information is recorded is formed as an erased area. Then, regarding means for erasing, there can be suitably selected a DC erase, an AC erase, etc. The AC erase is preferable as described later. Easing may be performed at the time of formatting. Or, the front surface may be erased prior to the format. Or, in a case that a magnetic state of the magnetic disk before formatting is substantially equivalent to the erase state, recording may be performed based on the format as shown in FIGS. 13A and 13B.

Twice area, which is used to write ID information, is needed. However, since the amount of data of the ID section is originally slight, the reduction of the format efficiency can be disregarded. Therefore, there can be obtained an extremely large advantage in the improvement of reliability and the density of the track.

A first modification of the magnetic disk drive of the first embodiment of the present invention will be explained with reference to FIGS. 14A to 15B. In FIGS. 14A to 15B, the explanation of the portions common to FIGS. 12A to 13B is omitted.

In this modification, the positioning offset is provided to the magnetic head such that the write head is set to be on-track in the data area at the write operation and the read head is set to be on-track in the data area at the read operation. Then, in order that the read head is included even when the read head is set to be in an off-track state at the recording mode, the record width (W) of the ID section is made wider than the record width (Tp) of the data section. Due to this, since the read head is always presented in the track in which ID information is recorded, and reads ID information, information of the ID section can be stably read at both write and read operations.

In addition, similar to the first embodiment, since both sides of the ID section are erased, there is brought about an advantage in which the off-track margin is wide in the case that the head is off-track by various types of noise and disturbance.

Regarding the above-mentioned wide ID information area, for example, ID information is recorded with the same width as the data section, a predetermined amount of offset is added to the head, the phases are correctly arranged, and recorded ID information is overwritten to the previously written information, whereby, the above-mentioned wide ID information area can be obtained.

A second modification of the magnetic disk drive of the first embodiment of the present invention will be explained with reference to FIGS. 16A to 17B. In FIGS. 16A to 17B, the explanation of the portions common to FIGS. 12A to 13B is omitted.

In this modification, the record width (W) of the ID section is the same as the case of FIGS. 12A to 12C. However, a predetermined amount of offset (Δ) is added to the head at the ID information write operation so as to record ID information. The amount of offset (Δ) is fixed such that ID information is recorded at substantially the center between the read head position at the write operation and the read head position at the read operation.

Similar to the above embodiment, the positioning offset is provided to the magnetic head such that the write head is set to be on-track in the data area at the write operation and the read head is set to be on-track in the data area at the read operation. In this case, the provision of the positioning offset to the magnetic head is that the read head reads information in an off-track state, which is equal to the recording track of ID information at both the write and read operations. Then, there is no generation in which either the write operation or the read operation is disadvantageous in terms of S/N, and as a general, reliability of the device can be improved.

Similar to the first embodiment, since both sides of the ID section are erased, there is brought about an advantage in which the off-track margin is wide in the case that the head is off-track by various types of noise and disturbance.

Figure 18:
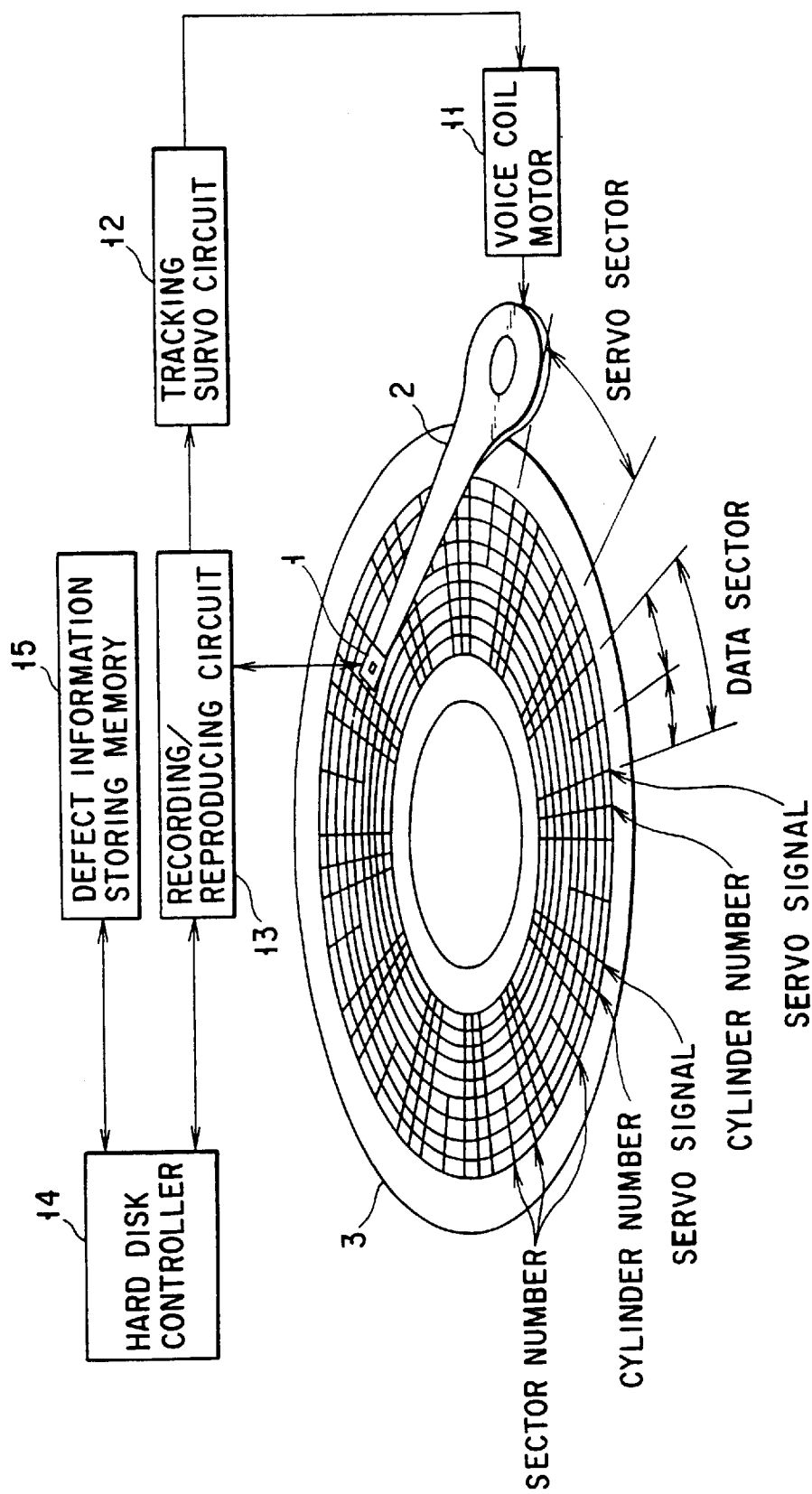
FIG. 18 is an outline view of a magnetic disk drive of a second embodiment of the present invention.

FIG. 18 is an outline view of the magnetic disk drive of the second embodiment of the present invention.

In this embodiment, there is used the magnetic disk 3 in which a servo signal for head positioning is recorded in the data surface. The composite magnetic head 1 is attached to the rotary actuator 2. The movement of the rotary actuator 2 is controlled in a radial direction of the magnetic disk 3 by a VCM (voice coil motor) 6 in accordance with a track position control signal sent from a tracking servo circuit 12. The tracking servo circuit 12 controls the positioning of the composite magnetic head 1 in accordance with servo information reproduced through a recording/reproducing circuit 13, in order that the write head is on-track in the data area on the magnetic disk 3 at the write operation, and the read head is on-track in the data area at the read operation.

On the magnetic disk 3, there are provided an area where cylinder number information is recorded, and an area where sector number information is recorded. It is assumed that at least one of cylinder number information and sector number information is recorded with a width larger than a track pitch. The device of this embodiment has a defect information storage memory 15 comprising a nonvolatile solid memory for storing a defect sector on the magnetic disk 3 and defect track information. The defect sector on the magnetic disk 3 and defect track information may be stored in a specific area on the magnetic disk 3.

In the conventional magnetic disk drive, it is needed that ID information (cylinder number, head number, sector number, and presence or non-presence of the defect) recorded in the head of each sector should be read before processing the data area even when the recording or read operation is performed. In contrast, according to this embodiment, since there is provided an area where cylinder number information is recorded close to an area where servo information is recorded, the cylinder number can be detected and confirmed. Then, since there is provided an area where sector number information is recorded in the front of each data sector, it is possible to confirm the sector number before the recording or read operation.

Moreover, in the device of this embodiment, in order to store the defect sector on the disk and defect track information into the memory 10, the defect sector and defect track information are read from the memory 10 at the time of staring the device, thereby making it possible to confirm whether the sector to be accessed is a defect sector nor not beforehand without accessing. The head number does not have to be written to the ID section if a physical head number and a logical head number are the same. In some magnetic disk drives, there is a case that the logical head number seen from the outer unit, the cylinder number and the sector number are different from the logical head number, the cylinder number and the sector number, which are recorded on the disk. This case can be dealt by providing an allocation table is to a suitable memory. Therefore, the head number can be confirmed without recording it to the ID section.

In this embodiment, it is needed that a hard disk controller 14 (HDC) for controlling the recording/producing circuit 13 be changed for the conventional HDC. However, processing can be performed by use of ID information (cylinder number, sector number, head number and detect information), which is sequentially confirmed by a different timing, by the above-mentioned method in accordance with a condition of interface. In a case that the conventional IC for HDC, serving as HDC 14, is used, a suitable circuit is added thereto, and a signal may be transmitted by the same timing when the conventional ID section is read before the recording/reproducing is performed in the data area.

According to the above-mentioned embodiment, even if a format in which the ID section is omitted is used in the magnetic disk 3, all necessary ID information can be confirmed prior to data write operation.

In recent years, the so-called sector servo system, which is popularly used in a data surface servo system, has been mainly used in accordance with improvement of track density. In a recording system at the same transfer rate from the outer circumference to the inner circumference, the servo sector and the data sector are the same in almost all cases. In the case the both are the same, for example, servo data, cylinder number information, and sector number information are sequentially stored, and the data area continues after a suitable gap is provided for changing the recording/reproducing circuit.

In contract, in so-called CDR (Constant Density Recording) system in which the data area is divided into several zones, the transfer rate is increased in the outer circumference zone, and the recording is performed at substantially the same recording density through the inner and outer circumferences so as to increase the capacity of data, there is a case that both the servo sector and the data sector do not conform to each other. In such a case, cylinder number information is recorded sequentially after servo information of each servo sector, and sector number information is recorded in the head of each of the data sectors through a suitable gap for changing the recording/reproducing circuit.

If the phases of sector number information are arranged (the phases are arranged in the zone in the case of CDR) and recorded, it is advantageous that completely the same data can be read by the recording/reproducing track misregistration even if the head is off-track.

Among the above ID information, cylinder number information and sector number information can be recorded at the same time at the servo write operation. In this way, by recording these cylinder number information and sector number information at the same time at the servo information write operation, the phases and the tracks can be correctly adjusted and recorded similar to servo information. Unlike ID information recorded at the time of the format in the prior art, high accurate recording in which the phase controlled can be performed. Moreover, time for recording ID section at the formatting the disk can be omitted, and there can be obtained an advantage in which a formatting efficiency can be improved. The method for recording cylinder number information will be explained in an embodiment described later.

As means for realizing the head tracking servo, which can position the magnetic head such that the write head is on-track in the data area at the write operation and the read head is on-track in the data area at the read operation, there may be used a servo pattern in which a head positioning servo signal for is recording and a head positioning servo signal for reproducing are separately written. Or, in order to compensate for the recording/reproducing track misregistration, offset may be provided to position the head. The following embodiment mainly describes a case in which the offset is provided.

A first specific example of the second embodiment will be explained with reference to FIGS. 19A to 20B.

Figure 19A:
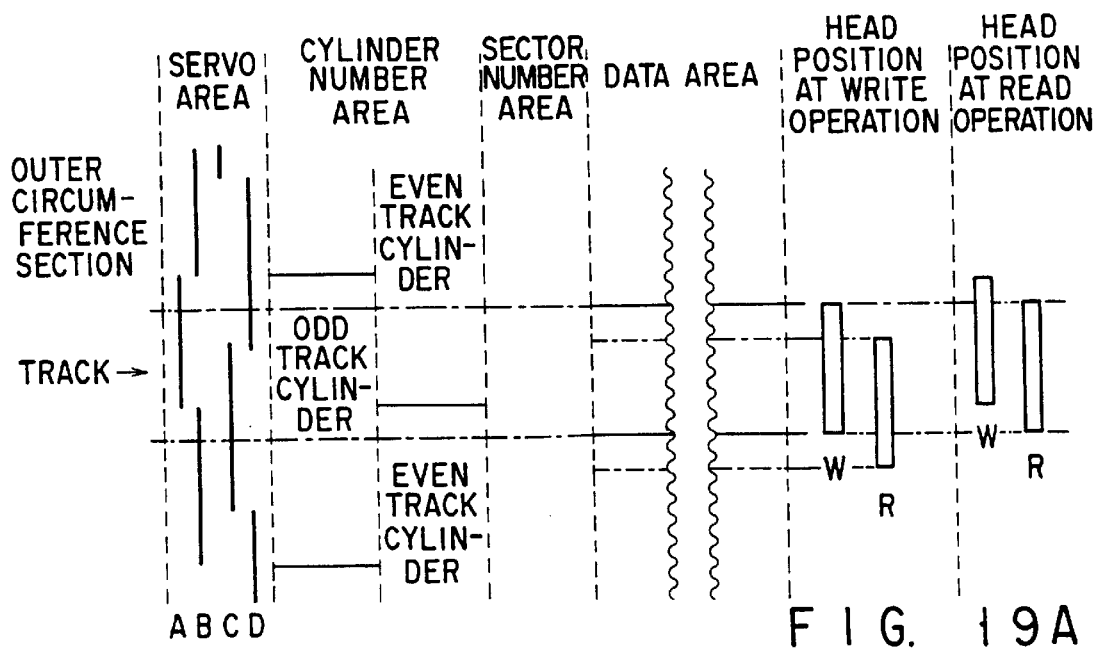
FIGS. 19A to 19C are views showing a first specific example of the second embodiment of the present invention.
Figure 19B:
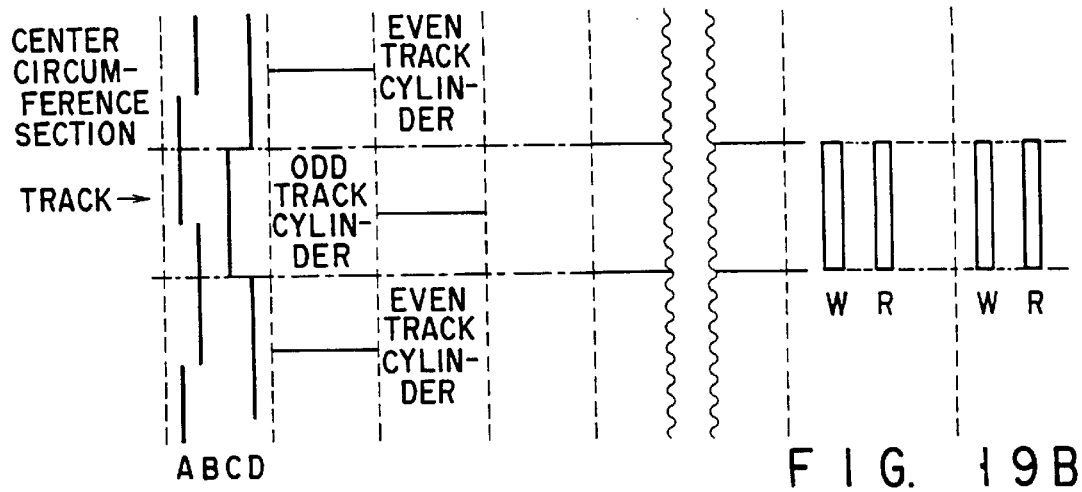
Figure 19C:
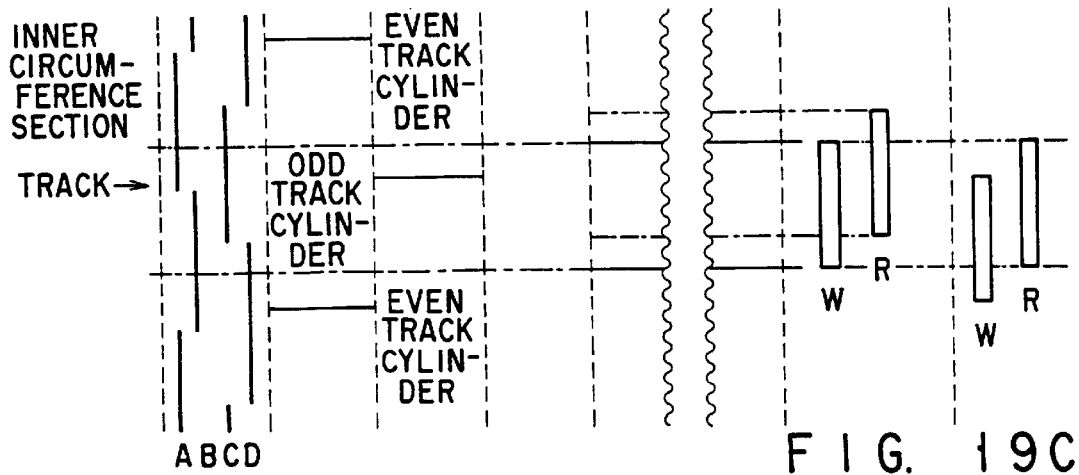
Figure 21A:
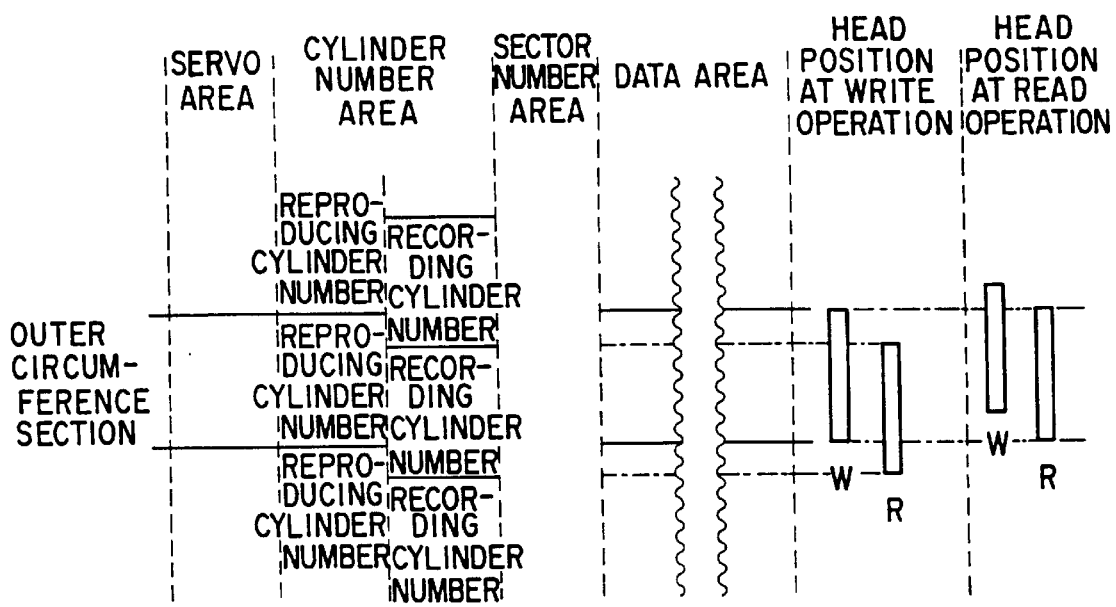
FIGS. 21A to 21C are views showing a second specific example of the second embodiment of the present invention.
Figure 21B:
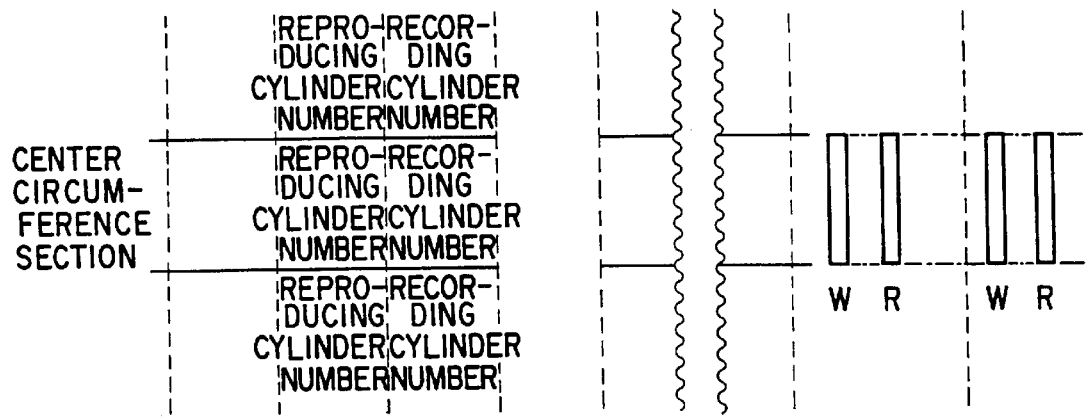
Figure 21C:
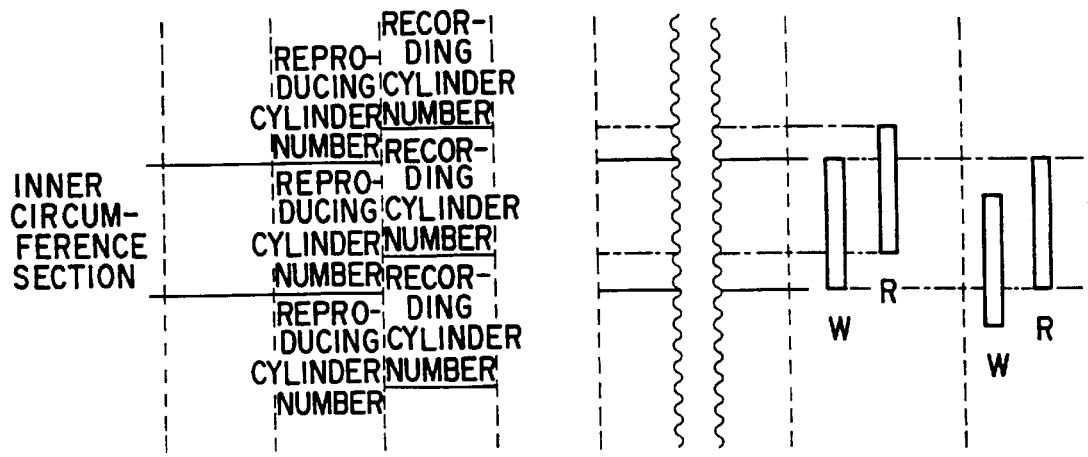
Figure 22A:
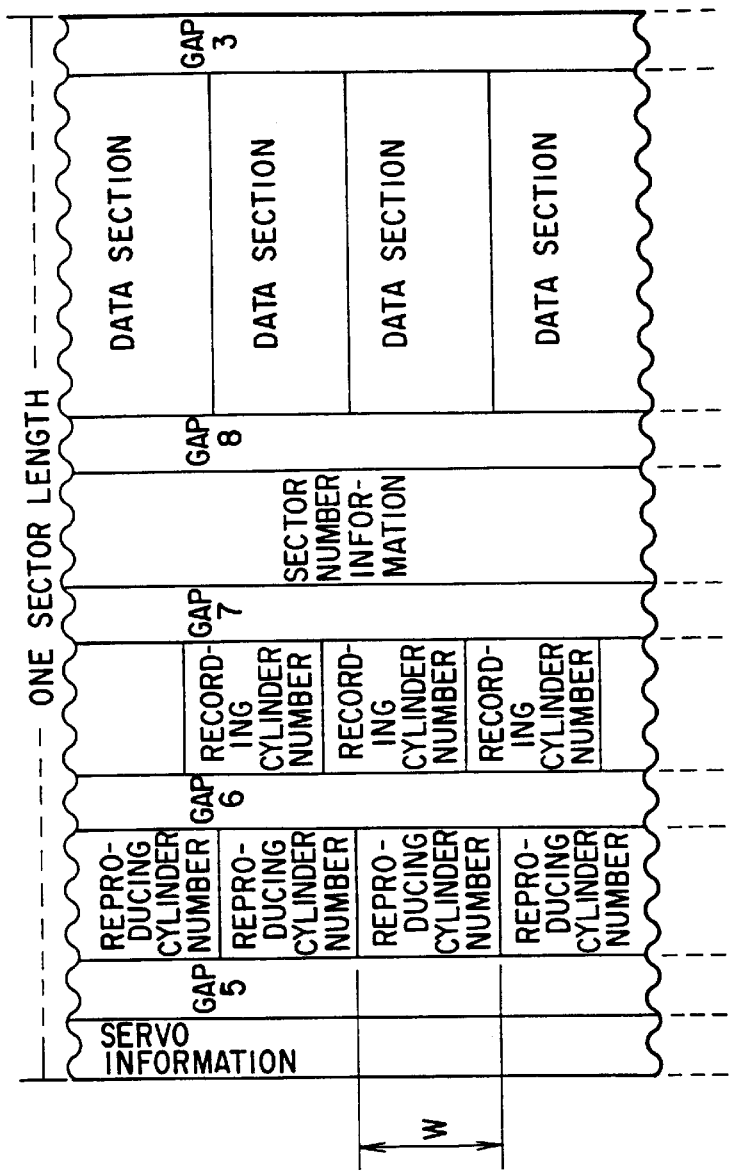
FIGS. 22A and 22B are views showing a cylinder number portion of the second specific example of the second embodiment of the present invention.
Figure 22B:
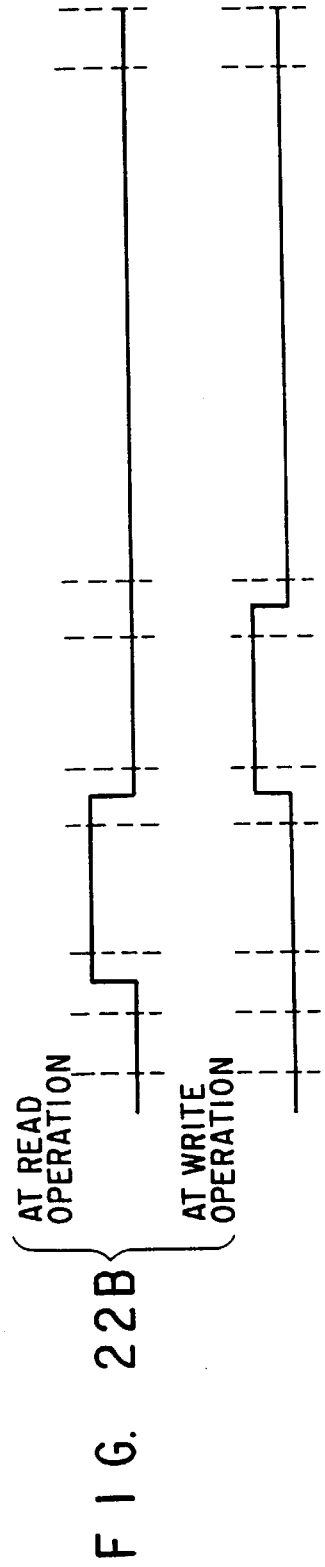
Figure 23A:
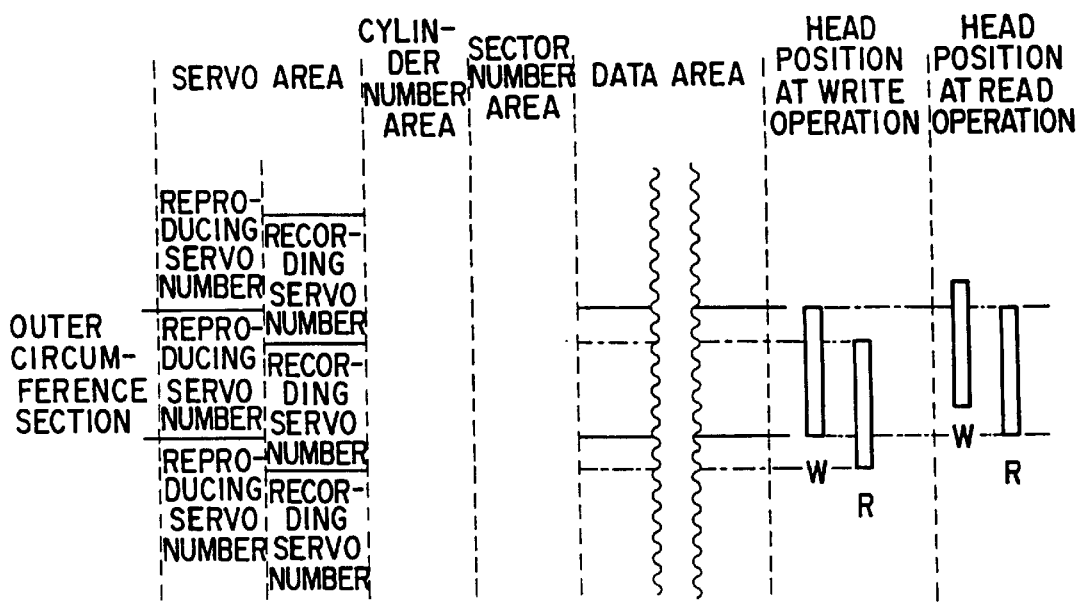
FIGS. 23A to 23C are views showing a third specific example of the second embodiment of the present invention.
Figure 23B:
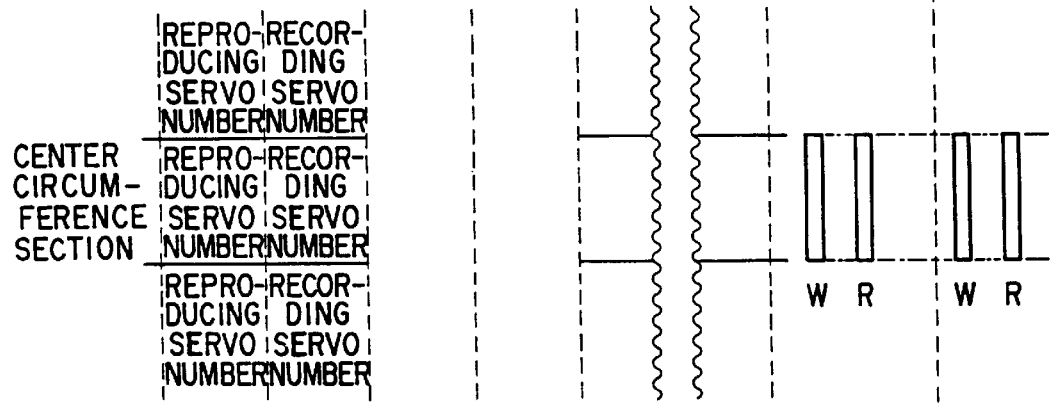
Figure 23C:
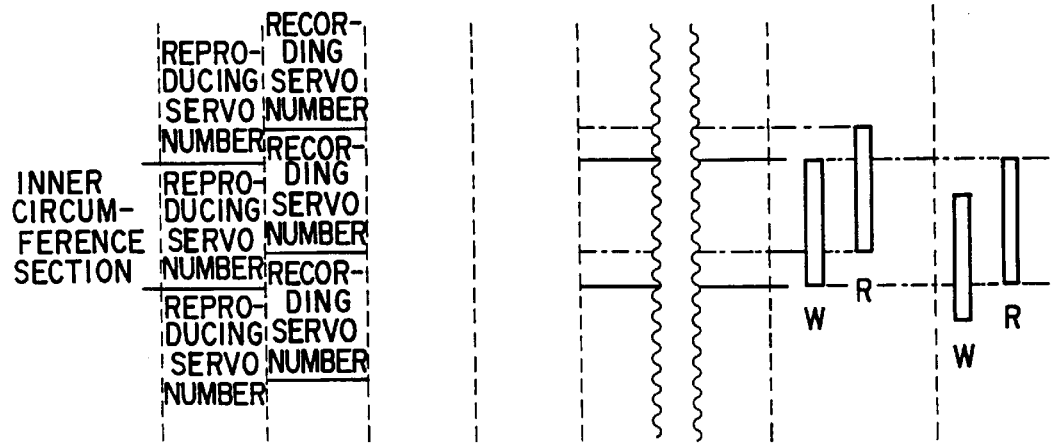

As shown in FIG. 18, in a case that the composite head in which the write head and the read head are structured in the composite form is applied to the magnetic disk drive on which the rotary actuator 2 is mounted, if the composite magnetic head 1 is moved from the inner track of the magnetic disk 3 to the outer track of the magnetic disk 3 by the rotation of the rotary actuator 2, as shown in the right side of each of FIGS. 19A to 19C, each of the position of the write head (shown by W in the figure) and the position of the read head (shown by R in the figure) generates a position misregistration in the track area.

If n is set to 2 or more natural number, cylinder number information is recorded in a different phase relationship each other in accordance with a remainder obtained when the cylinder number is divided by n. Regarding the setting the natural number, in consideration of the recording/reproducing track misregistration, head width tolerance, and amount of random off-track, if the width with which the read head can read information is set to X, n may be selected such that n TP>X (Tp=track pitch). In a case that the recording/reproducing track misregistration is small, n=1, that is, cylinder number information, which is recorded in the width of the full of the track pitch, is used.

FIGS. 19A to 19C show the case of n=2. That is, these figures show the positional relationship between the cylinder number area format and the head in the outer circumference section of the magnetic disk, central section, and odd tracks of the inner circumference section. The positioning offset is provided to the magnetic head such that the write head is set to be on-track in the data area at the write operation and the read head is set to be on-track in the data area at the read operation, thereby making it possible to perform write/read operations in the data area. In this case, the cylinder number section is read in a state that the read head is off-track at the time of the recording mode. However, since the cylinder number section has twice width as large as the track pitch, there is brought about an advantage in which an off-track margin is larger than a conventional method in which data are recorded in the adjacent tracks.

FIGS. 20A and 20B show an example of the cylinder number section format in this embodiment together with a read gate signal of a controller for reproducing the cylinder number section.

In this embodiment, since the recording positions of cylinder number information in odd number tracks and even number tracks are recorded in a different phase relation each, timing for reproducing cylinder number information is changed at each of the odd tracks and the even tracks. A GAP 6 for changing various kinds of gate signals is provided as required.

In the width (W) for recording cylinder number information, since the same recording as the servo signal can be performed, the phases are arranged as information is sent in a radial direction with a half pitch of the track pitch, and overwritten, so that cylinder number information is recorded in the width of the full of the track pitch. Therefore, cylinder number information can be recorded with a wider recording width than the recording width of the data area (in the figures, since the guard band is omitted, the same width is shown), which is determined by the width of the recording head. About twice area, which is used to write cylinder number information, is needed. However, since the amount of data of the cylinder number area is originally slight, there can be larger advantage in the improvement of the format efficiency due to the omission of the ID section. Moreover, there can be obtained an extremely large advantage in the improvement of reliability and the track density.

FIGS. 21A to 22B show the positional relationship between a cylinder number area format and the head in the track of each of the outer circumference section, center circumference section, and inner circumference section. In order that such that the write head is set to be on-track in the data area at the write operation and the read head is set to be on-track in the data area at the read operation, the positioning offset is provided to the magnetic head, thereby making it possible to perform read/write operations in the data area. In this case, in order that the write head is set to be on-track state in the data area at the write operation and the read head is set to be on-tack state in the data area at the read operation, the positioning offset is provided to the magnetic head. In addition, there are provided first cylinder number information, which is recorded at a position where the read head is set to be on-tack state at the data read operation, and second cylinder information, which is recorded at a position where the read head is set to be on-track state at the data write operation. Due to this, in any cases, the read head can reproduce the cylinder number section in a state that the read head is on-track, and cylinder number information can be stably read at both write and read operations.

A third specific example of the second embodiment will be explained with reference to FIGS. 23A to 24B.

In this example, servo information is read by the read head so as to realize a head tracking servo, which can position the magnetic head such that the write head is set to be on-track in the data area at the write operation and the read head is set to be on-track in the data area at the read operation. There are provided first servo information, which is recorded such that the write head is set to be on-tack in the data area at the write operation, and second servo information, which is recorded such that the read head is set to be on-track in the data area at the read operation. Thereby, the write/record heads can be correctly set to be on-track at the recording/write operations, respectively.

Figure 25A:
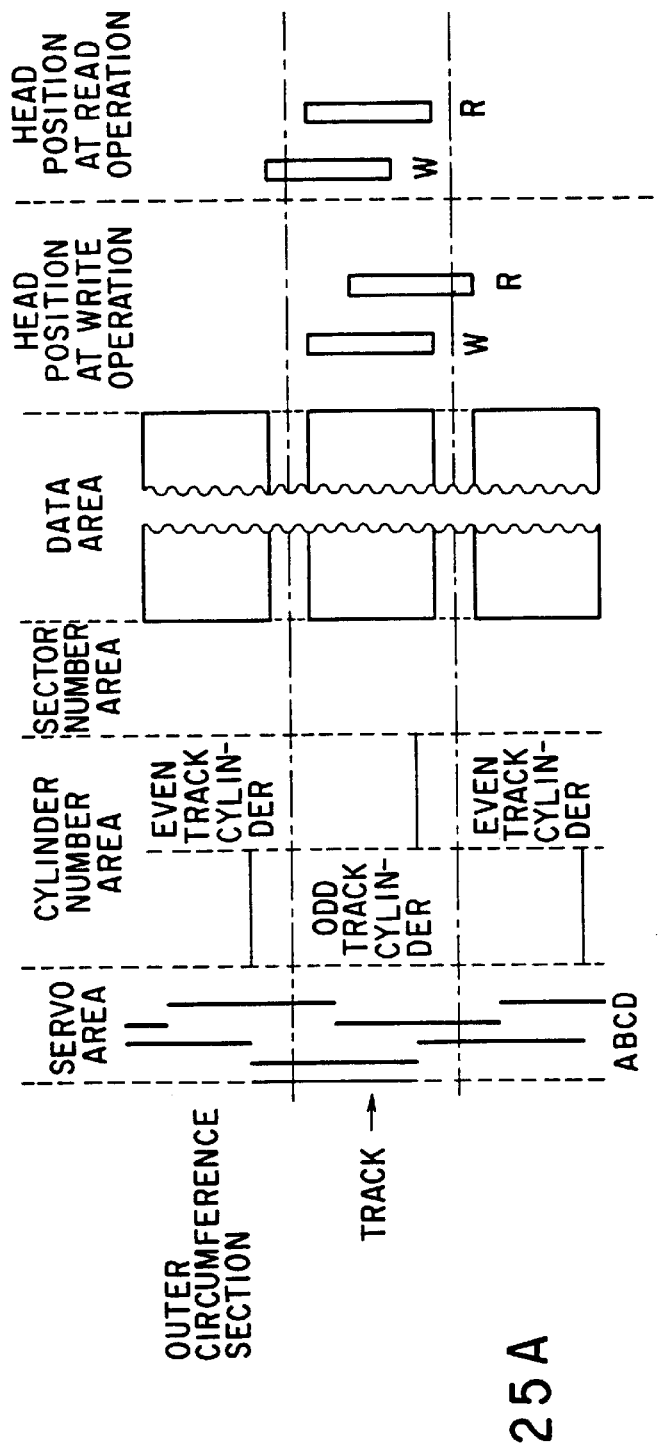
FIGS. 25A and 25B are views showing a third embodiment of the present invention.
Figure 25B:
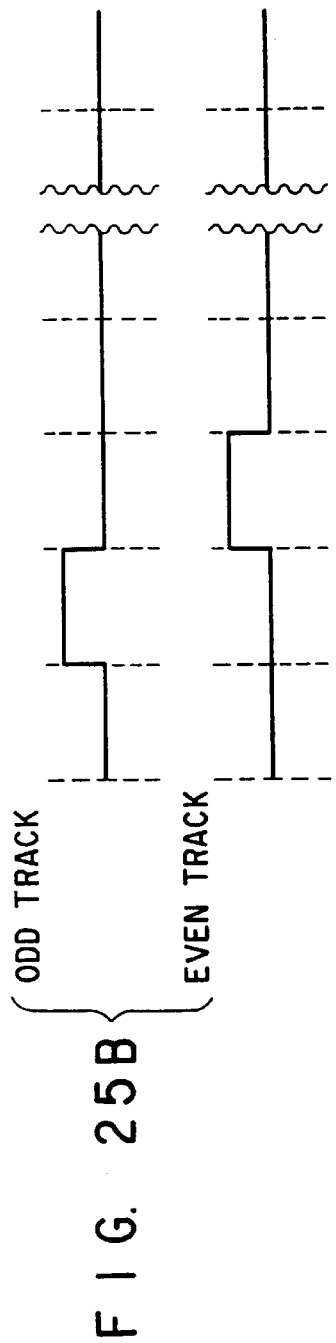

A magnetic disk drive of a third embodiment of the present invention will be explained with reference to FIGS. 25A and 25B.

According to the third embodiment, the ID area is divided into two areas of odd and even tracks, and the width of each ID area is set to an integral multiple of a pitch width of the servo positioning. In other words, as shown in FIG. 25A, the width of each of the ID areas is set be twice as large as the pitch width of the servo positioning. In this case, for example, the odd ID area has an width in which servo positioning pitches A and B are added. Thereby, since there is no need that ID information is overwritten with a half pitch of the write head, time for recording ID information can be shortened.

A magnetic disk drive of a fourth embodiment of the present invention will be explained with reference to FIG. 26. FIG. 26 is a diagram showing that a servo pattern is recorded in the present invention.

Prior to recording the servo pattern onto the magnetic disk 3, an index, serving as a reference and a clock for servo signal are written into the track (hereinafter called as a servo clock track), which is fixed on the magnetic disk 3, by use of a clock head 7 in order to record the servo pattern generated by a clock generating circuit for separating index signal from servo signal. At the servo pattern write operation, the index signal for obtaining timing to record the servo pattern and the clock for servo signal are reproduced by the clock head 7.

A clock separating circuit 27 for index and servo signals separates the clock for index and servo signals from a reproducing signal sent from the clock head 7, and transmits the signal to a servo pattern generating circuit 25. The servo pattern generating circuit 25 generates a signal for recording the servo pattern based on timing due to the clock for index and servo signals. At this time, burst pattern data in a positioning data area are generated based on the clock for servo signal. However, in an AC signal area other than the burst pattern of positioning data, the servo pattern is structured in accordance with the clock having a higher frequency than the frequency of the burst pattern generated by a clock generating circuit 26 for AC signal. A series of the servo pattern recording signal, which is structured by the servo pattern generating circuit 25, is sent to an recording/reproducing amplifier for the servo pattern recording, and recorded onto the magnetic disk 3 by the write head of the MR head.

The position of the head is detected by a head position detecting circuit 23 using a laser measuring device. A head position control circuit 22 generates a head position control signal by use of a signal showing the head position. An actuator driver 21 is driven, and the servo pattern is recorded as the head is sent. Thereby, a predetermined servo pattern is recorded on the entire circumference of the magnetic disk.

Figure 27:
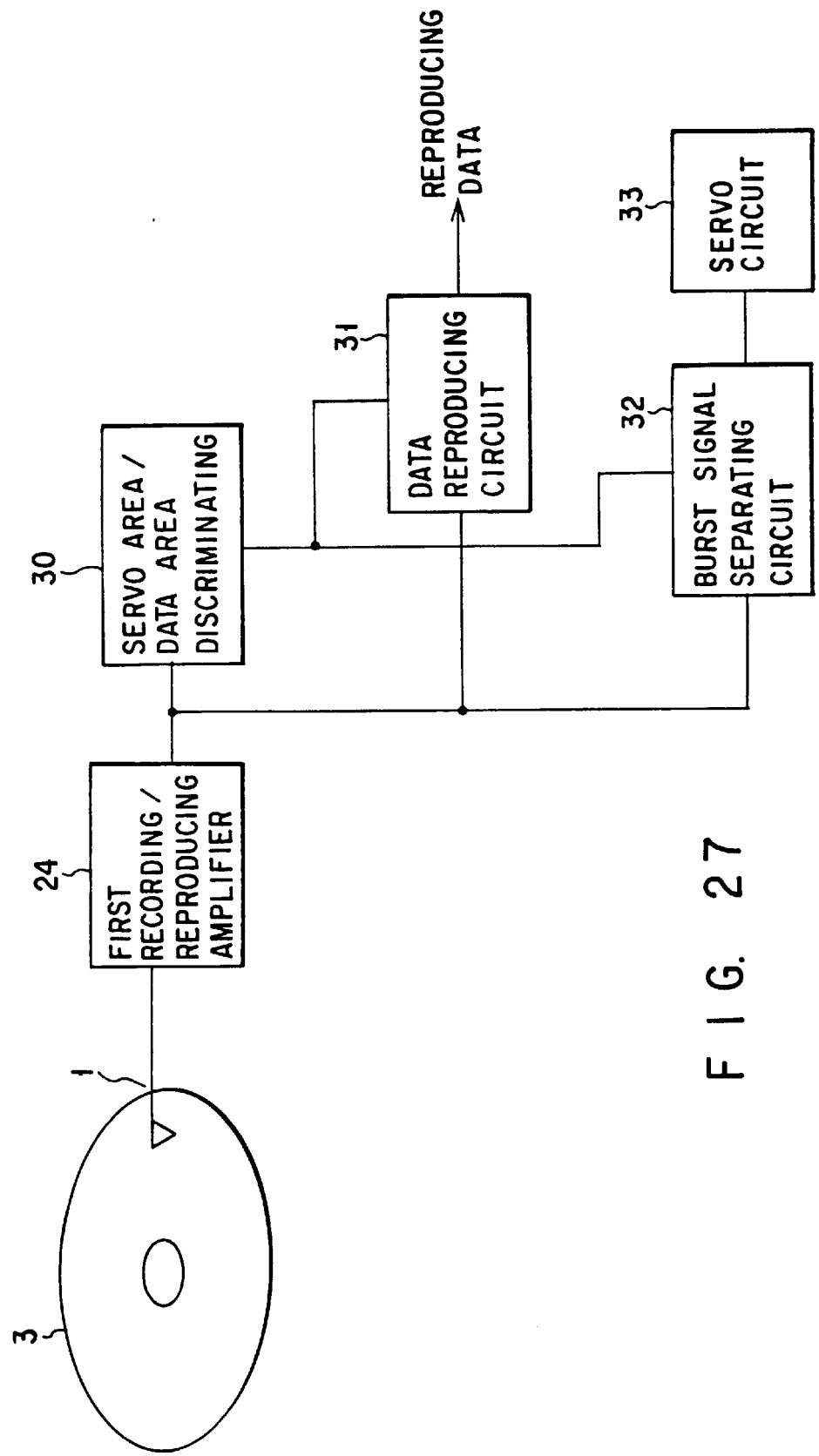
FIG. 27 is a block diagram of a reproducing circuit in a case that the servo pattern of the fourth embodiment is used.
Figure 29A:
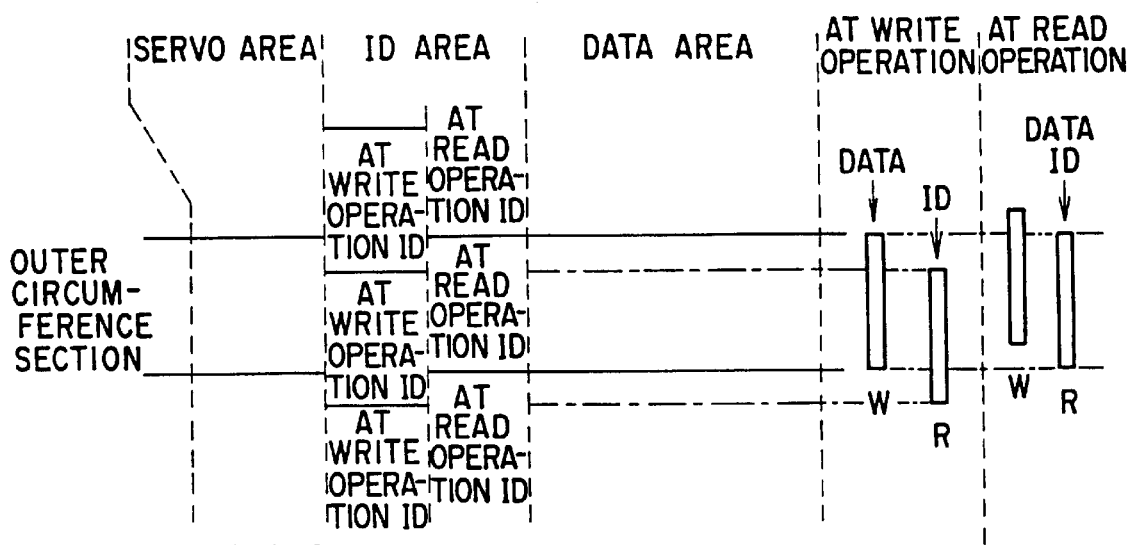
FIGS. 29A to 29C are views showing a fifth embodiment of the present invention.
Figure 29B:
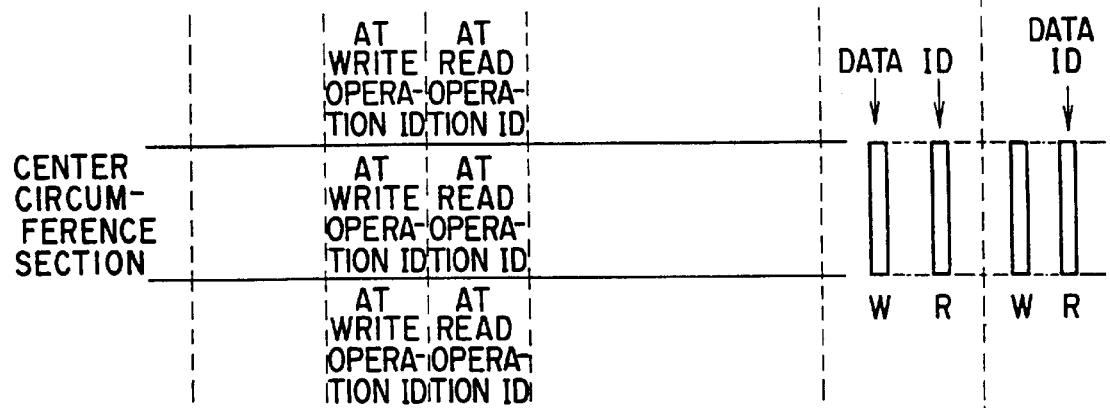
Figure 29C:
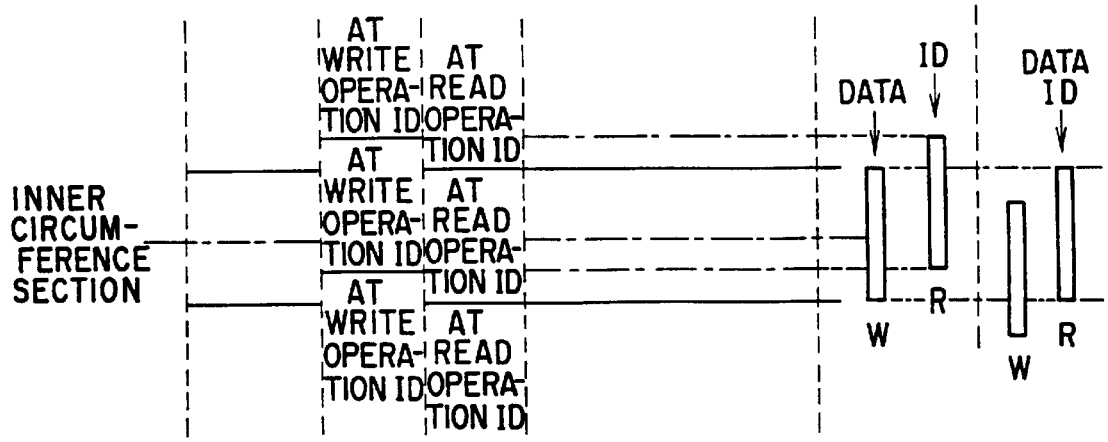

FIG. 27 is a block diagram showing a generating circuit in a case that the servo pattern recorded by the device of FIG. 26 is used.

The reproducing signal reproduced by the MR head from the magnetic disk is amplified by a recording/reproducing amplifier, and sent to a servo area/data area discriminating circuit 30, a data reproducing circuit 31, and a burst signal separating circuit 32. The reproducing signal, which is recognized as a data area by the servo area/data area discriminating circuit 30, is modulated by the data reproducing circuit 31, and transmitted as producing data. The reproducing signal, which is recognized as a servo area by the servo area/data area discriminating circuit 30, is passed through a low pass filter or a bust signal separating filter 31 having a band-pass filter characteristic, information is extracted from the bust pattern. Then, information is sent to a servo circuit 33, and used in controlling the head position.

FIG. 28 is an example showing a recording pattern of a bust portion A and that of a burst portion B. Similar to the burst portions A and B, in burst portions C and D, the portion other than the burst portions is recorded by the AC signal having a higher recording frequency than the burst portions. The AC signal portion does not need to adjust to the phase every a half track pitch.

A fifth embodiment of the present invention will be explained with reference to FIGS. 29A to 30B. FIGS. 29A to 30B show the positional relationship between an ID area format and the head in the track of each of the outer circumference section, center circumference section, and inner circumference section. In order that such that the write head is set to be on-track in the data area at the write operation and the read head is set to be on-track in the data area at the read operation, the positioning offset is provided to the magnetic head, thereby making it possible to perform read/write operations in the data area.

According to this embodiment, there are provided first ID information, which is recorded at a position where the read head is set to be on-track at the read operation, and second ID information, which is recorded at a position where the read head is set to be on-track in the at the write operation. Thereby, the read head reads the ID section in a state that the read head is on-track at the write/read operations, so that information of the ID section can be stably read at both write and read operations.

Figures 30A, 30B:
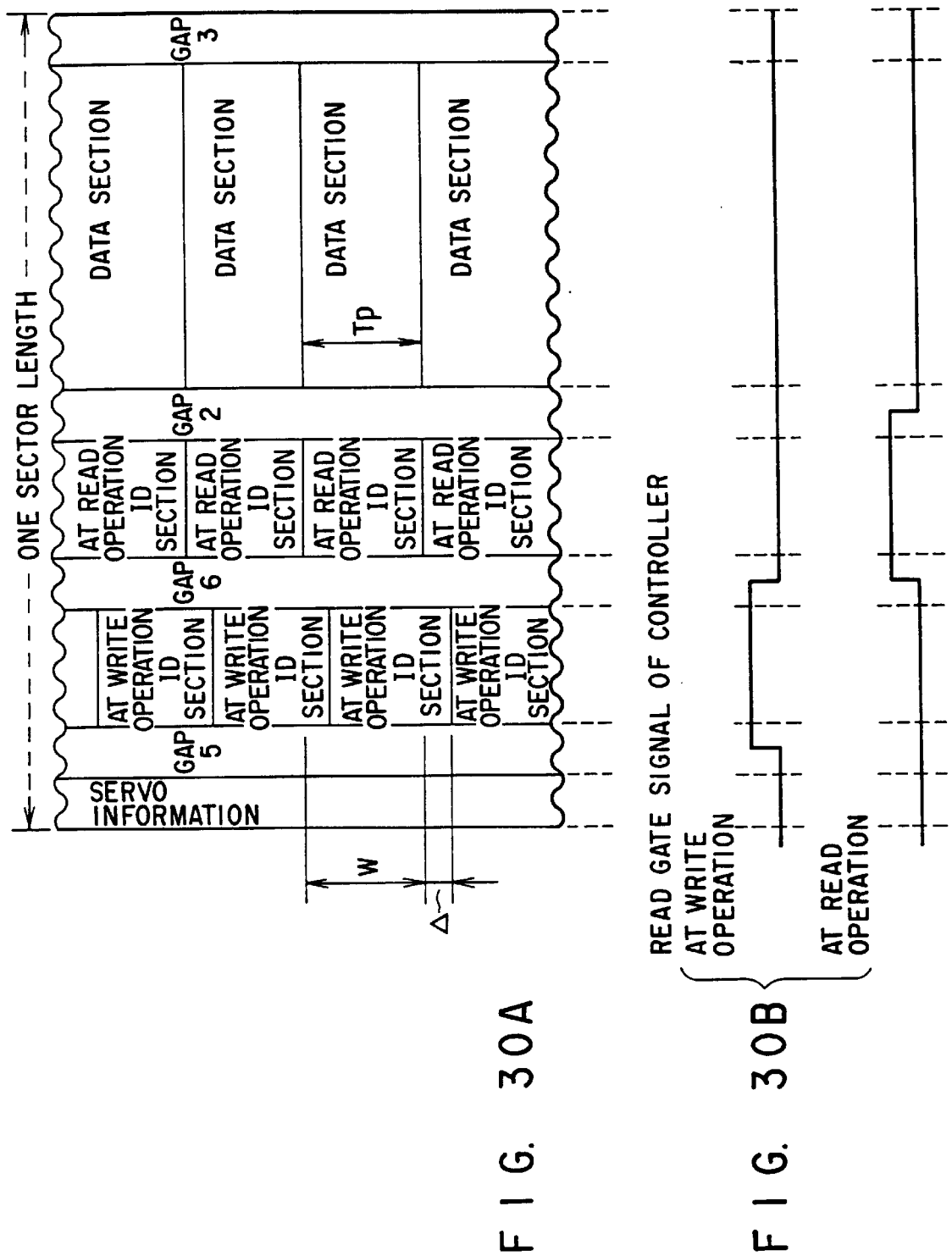
FIGS. 30A and 30B are views showing an ID section of the fifth embodiment of the present invention.

FIGS. 30A and 30B show an example of the ID section format in this embodiment together with a read gate signal of a controller for reproducing the ID section. In this embodiment, since the recording position of ID information is different in the write and read operations, timing for reproducing ID information is changed at each of the write and read operations.

Figure 31A:
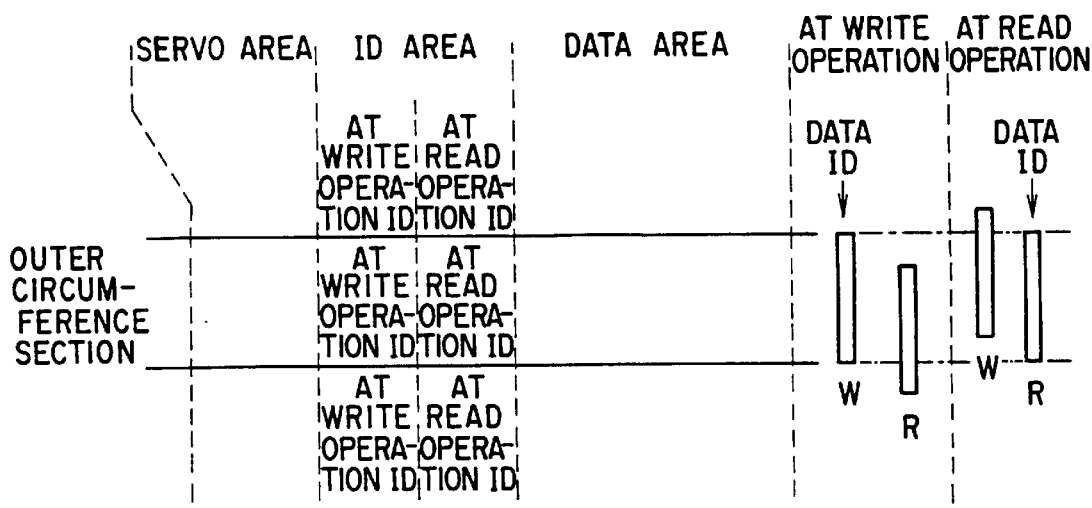
FIGS. 31A to 31C are views showing a sixth embodiment of the present invention.
Figure 31B:
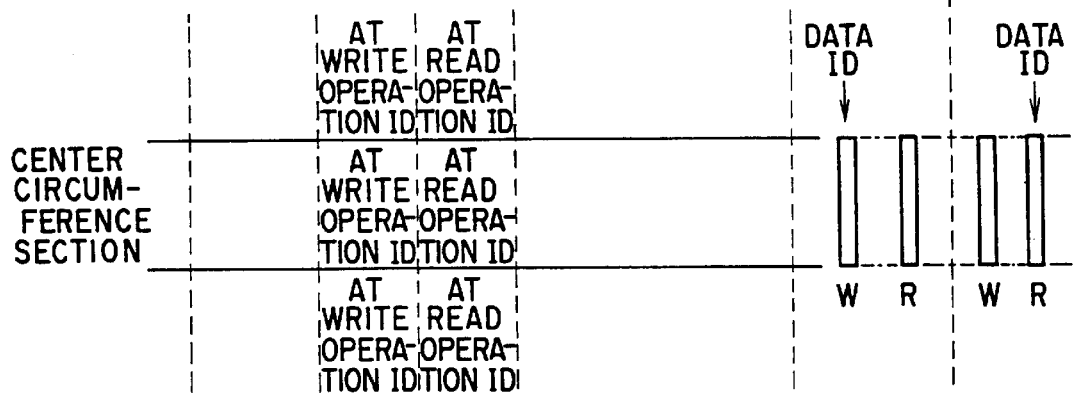
Figure 31C:
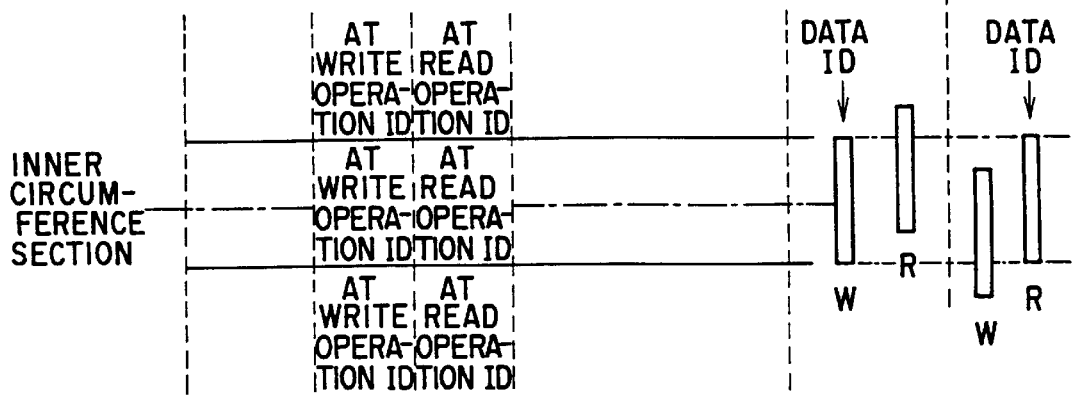

A sixth embodiment of the present invention will be explained with reference to FIGS. 31A to 32B. FIGS. 31A to 31C show the positional relationship between an ID area format and the head in the track of each of the outer circumference section, center circumference section, and inner circumference section. In order that such that the write head is set to be on-track in the data area at the write operation and the read head is set to be on-track in the data area at the read operation, the positioning offset is provided to the magnetic head, thereby making it possible to perform read/write operations in the data area.

According to this embodiment, at the data read operation, the read head reads first ID information, which is recorded by the format suitable for reproducing by use of the read head, in the on-track state. At the data write operation, the write head reads second ID information, which is recorded by the format suitable for reproducing by use of the read head and different from first ID information, in the on-track state. Thereby, information of the ID section can be stably read at both write and read operations.

In the composite head, the write head is naturally inferior to the read head in the ability of reproduction. Due to this, it is needed that second ID information read by the write head be by a suitable format for reproducing information in which a linear record density is made lower the first ID information for the head and redundancy is provided (for example, strong ECC (error correction code)) by use of the write head.

Figures 32A, 32B:
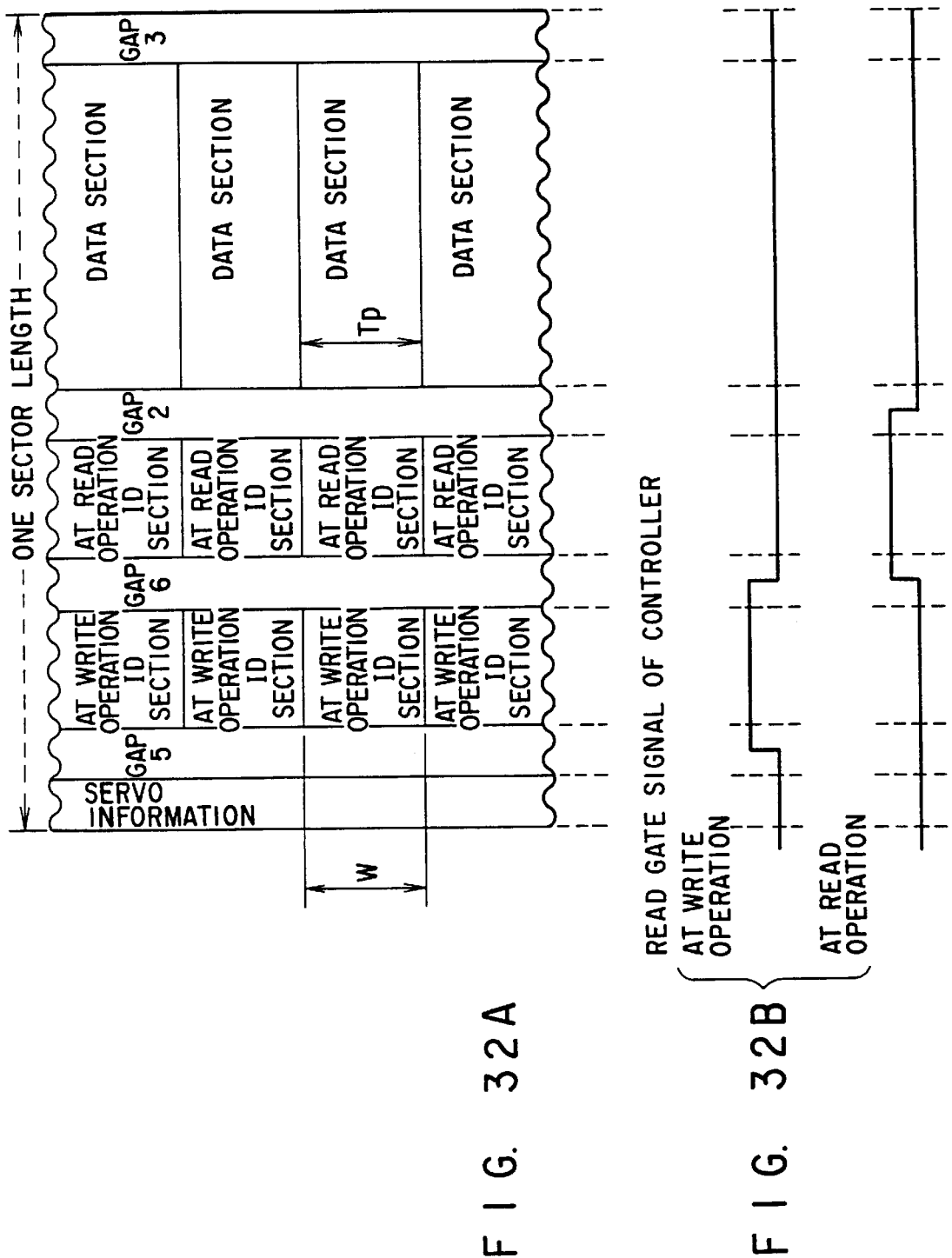
FIGS. 32A and 32B are views showing an ID section of the sixth embodiment of the present invention.

FIGS. 32A and 32B show an example of the ID section format in this embodiment together with a read gate signal of a controller for reproducing the ID section. In this embodiment, since the recording position of ID information is different in the write and read operations, timing for reproducing ID information is changed at each of the write and read operations. Generally, since conditions such as the frequency band of the filter and a constant of an equalizer are different in the case that the signal is read by the read head and the case that the signal is read by the write head, the reproducing circuit system or the constant of the circuit is preferably changed to be suitable for each case.

Figure 33A:
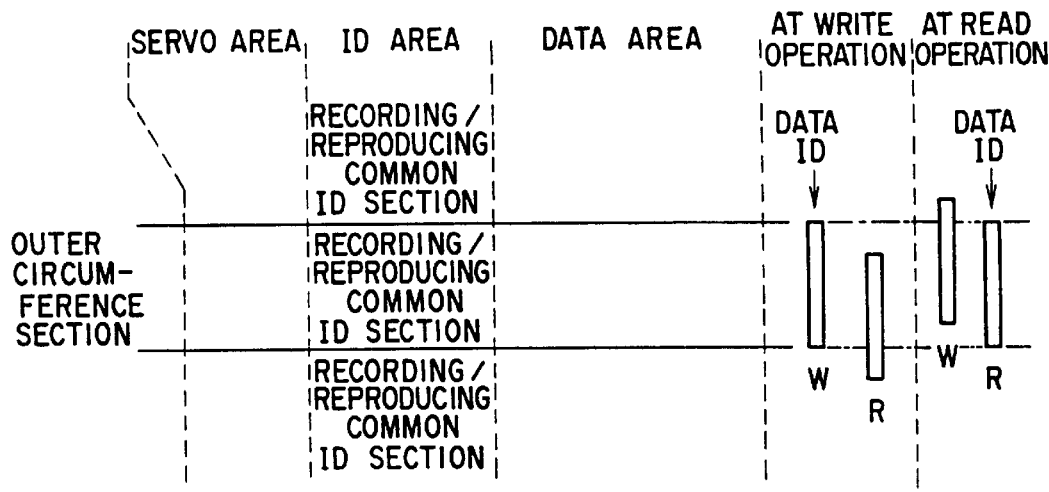
FIGS. 33A to 33C are views showing a seventh embodiment of the present invention.
Figure 33B:
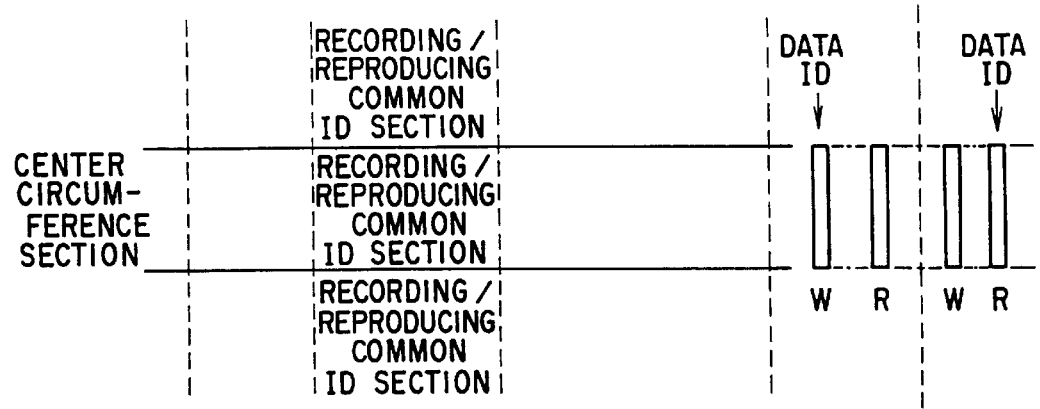
Figure 33C:
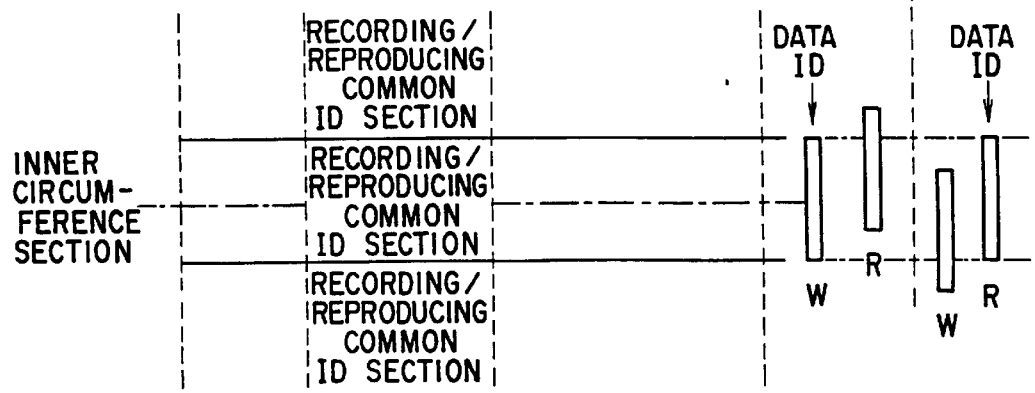

A seventh embodiment of the present invention will be explained with reference to FIGS. 33A to 33C, and 34. FIGS. 33A to 33C show the positional relationship between an ID area format and the head in the track of each of the outer circumference section, center circumference section, and inner circumference section. In order that such that the write head is set to be on-track in the data area at the write operation and the read head is set to be on-track in the data area at the read operation, the positioning offset is provided to the magnetic head, thereby making it possible to perform read/write operations in the data area.

According to this embodiment, ID information, which is recorded at relatively low record density as compared with the data area and can be read even by the read head or the write head, can read by the read head in a state that the read head is in an on-track at the read operation and by the write head in a state that the write head is in an off-track at the write operation. Due to this, information of the ID section can be stably read at both write and read operations.

In the composite head, the write head is naturally inferior to the read head in the ability of reproduction. Due to this, it is needed that second ID information read by the write head be by a suitable format for reproducing information in which a linear record density is made lower the first ID information for the head and redundancy is provided (for example, adding strong ECC (error correction code)) by use of the write head.

FIG. 34 shows an example of the ID section format in this embodiment. In this embodiment, since common ID information is read at both write and read operations, it is unnecessary to change timing for reproducing ID information at the write and read operations. Generally, since conditions such as the frequency band of the filter and a constant of an equivalent circuit are different in the case that the signal is read by the read head and the case that the signal is read by the write head, the reproducing circuit system or the constant of the circuit is preferably changed to be suitable for each case.

FIG. 35 shows an enlarged view showing the arrangement of servo information on the magnetic disk of an eighth embodiment. In this embodiment, first servo information 36 corresponding to the read head and second servo information 37 corresponding to the write head are alternately and dispersively recorded in a direction of a recording track 35, that is, a disk rotating direction (shown by θ). Each of first and second servo information 36 and 37 is used to position each of the read head and the write head.

Figure 36:
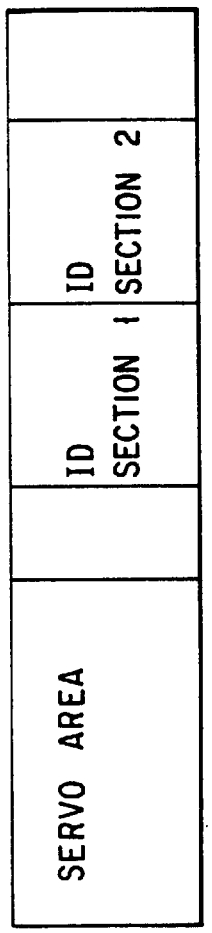
FIG. 36 is a view showing the details of servo information of FIG. 35.

FIG. 36 shows an enlarged view of servo information shown in FIG. 35. In this figure, there are formed a servo area where first and second information for recording and reproducing position information are recorded, and an ID section 1 and an ID section 2 for recording and recording through a gap GAP. Since the ID section is normally read at both write and read operations, two ID sections 1 and 2 are provided for recording and reproducing. In the servo area, there is recorded discrimination information of 0 or 1 for discriminating whether servo information is first servo information (for recording) or second servo information (for reproducing). Discrimination information may be provided in ether ID section 1 or ID section 2. However, discrimination information is preferably written in the servo area as mentioned above so as to prevent information of ID section 1 and ID section 2 from being increased.

Since the ID sections are dispersively recorded, the ID sections cannot be read if the position of the track and that of the head misregistrations. Due to these, two ID sections for recording and reproducing are used. Since servo information is written by a continuous recording system, servo information can be read if the position of the track and that of the head misregistrations. Due to this, position information for recording and reproducing appearing alternately can be read by one head.

Figure 37:
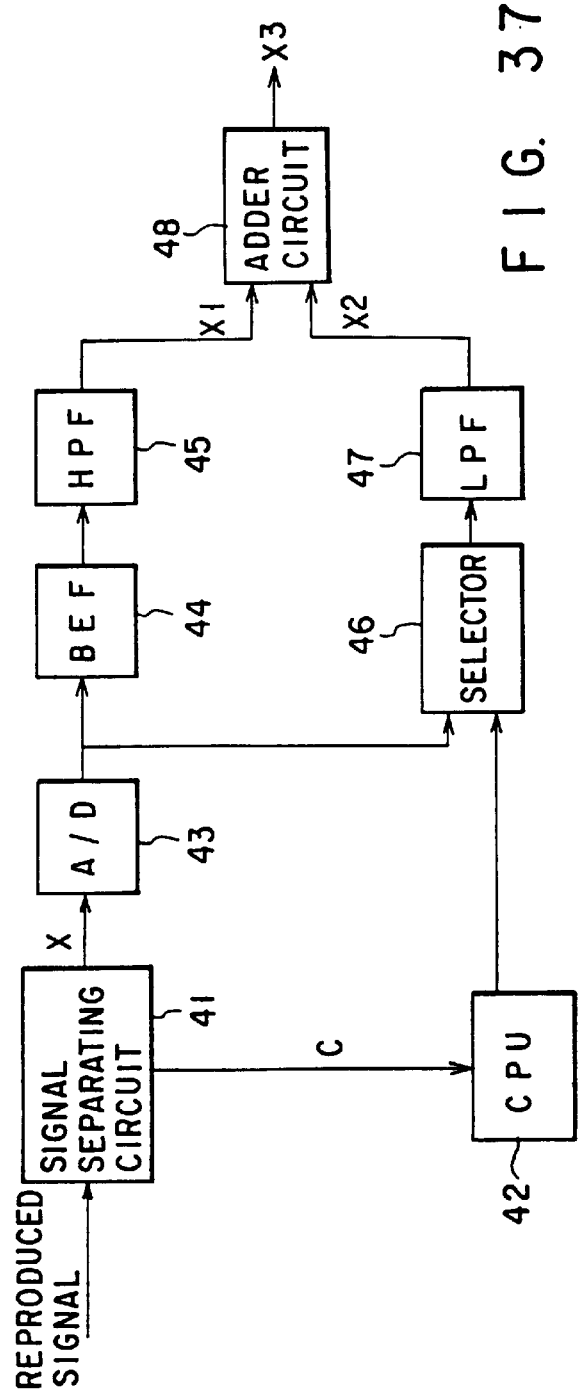
FIG. 37 is a block diagram showing the structure of a position information generating circuit of the eighth embodiment of the present invention.

FIG. 37 shows an example showing the structure of a position information generating circuit, and showing the portions of the recording/reproducing circuit 13 of FIG. 18 and the tracking servo circuit 12, which are related to this embodiment.

The reproduced signal 30 is a signal, which is read from the magnetic disk of FIG. 36 by the read head, and includes first and second servo information. The reproduced signal 30 is inputted to a signal separating circuit 41. Then, position error information X, which includes first and second position error information obtained from first and second servo information by the well-known means, and a control signal C, which includes the discrimination signal for discriminating whether servo information is used for reproducing or recording, are separated from each other. In this case, first and second position error information is information showing the position error of each of the write head and the read head. A CPU 43 receives the control signal C from the signal separating circuit 41, and controls the entire device.

Position error information C sent from the signal separating circuit 41 is sampled with a sampling rate Fs (sampling frequency) by an A/D converter 42 including a Zero-order holding circuit, and converted to a digital signal. Thereafter, the digital signal is inputted to a band rejection filter (BRF) 44, which cuts a frequency component of Fs/2. Then, a low frequency component including a DC component is cut by a high-pass filter (HPF) 45, so that first position information X1 is generated.

A selector 46 selects either first position error information, which shows the position error of the read head, or second position error information, which shows the position error of the write head, in accordance with a select control signal generated by the CPU 43 based on discrimination information. Position error information selected by the selector 46 is inputted, and the high frequency portion whose phase component is distorted is cut, so that second position information X2 is generated.

An adder circuit 48 adds and synthesizes first and second position information X1 and X2, and outputs third position information X3. In this case, the cut-off frequency of the high-pass filter 45 and that of the low-pass filter 47 (low cut-off frequency and high cut-off frequency) are conformed to each other, whereby first and second position information X1 and X2 are smoothly synthesized. Third position information X3 is formed by synthesizing first position information X1 including no DC component with second position information X2 having little AC component. In third position information X3, there is no component of Fs/2.

However, third position information is substantially the same as position information of sampling rate Fs, and there is little phase distortion up to the high frequency. Third position information X3 is fed back to VCM 11 of FIG. 18 through a VCM driver (not shown), and positions the composite magnetic head 1 to a predetermined position.

The above embodiments explained the case of dealing with the track misregistration due to the skew angle. In addition, it is obvious that the following point can be performed by the embodiments of the present invention. More specifically, in order to deal with deterioration of the signal generated by the recording/reproducing track misregistration caused by misregistration of the mask position during the step of laying the write head and the head, offset is provided to the head in accordance with misregistration of the write head and the read head and formatting is performed. The above-mentioned point is included in the feature of the present invention.

A more preferably manner of write/read composite head for improving a track density will be explained. In the following explanation, a portion of only the write head of the composite head will be illustrated and explained except for in case of need.

Figures 38A, 38B:
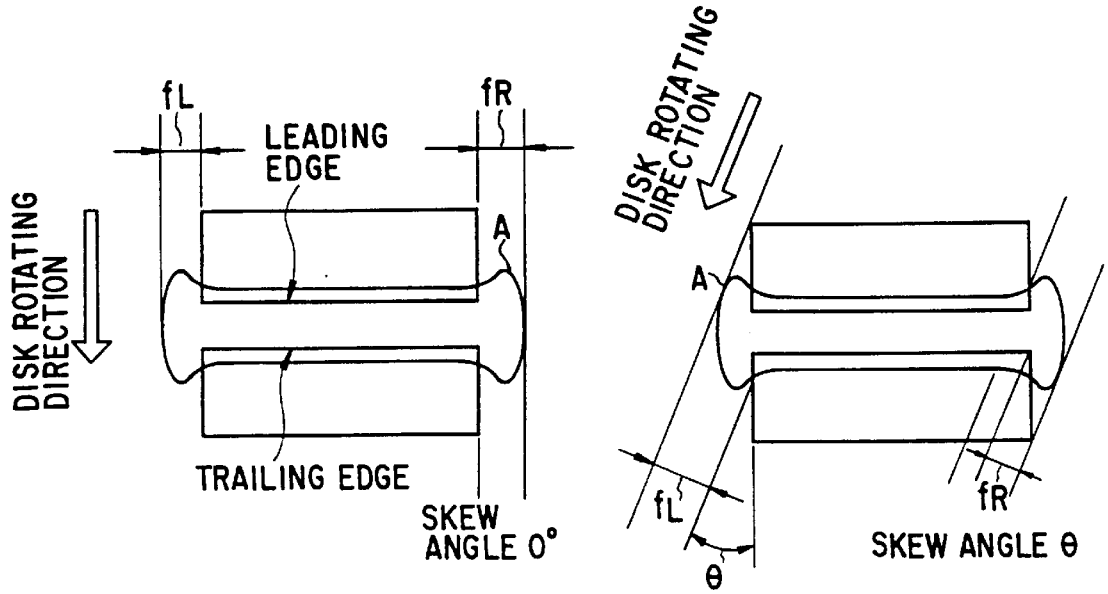
FIGS. 38A and 38B shows an example of equivalent magnetic field curve having recording magnetic field equal to coercivity (Hc) on the surface of the magnetic disk.

FIGS. 38A and 38B are schematic diagrams for explaining a side fringing phenomenon occurred at write operation with a ring-type head. FIG. 38A shows in case that skew angle is zero, FIG. 38B shows in a case that the skew is θ. A closed curve A shown in each of FIGS. 38A and 38B shows an example of equivalent magnetic field curve having recording magnetic field equal to coercivity (Hc) on the surface of the magnetic disk.

It is common knowledge that magnetization of the magnetic disk is reversed by enlarging an intensity of the magnetic field of the head equal to or larger than Hc of the magnetic disk. Accordingly, an inner portion of the closed curve A is changeable area of the magnetization and final recording state is basically determined by the magnetic field of the trailing edge of the head.

Since broad magnetic field is formed in a outside portion of the edge opposite to the magnetic disk, a formed flux reversal becomes broad. In addition, it has a problem such that a reversal position is different from the regular position and a noise of the magnetic disk is large. These phenomena are called as side fringing phenomenon in a general term and are important factors of narrowing an effective recording area, thereby obstructing an improvement of the track density.

When a recording is performed by using above-mentioned head, an influence of the side fringing is the same at right and left side of the head ($f_R=f_L=f_0$) at which a skew angle is zero. When a skew angle is not zero, a width of trailed area by side fringing magnetic field is widened and a normal recorded area is finally narrowed by the trailing edge at another edge. Therefore, an invalid area is extremely extended ($f_L>f_0$).

Figure 39:
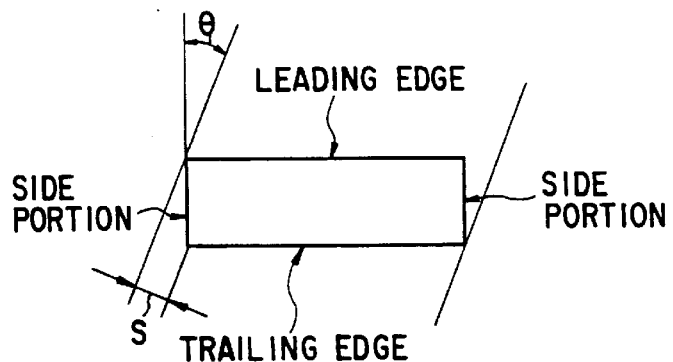
FIG. 39 is a schematic diagram for explaining a problem occurred during recording with single pole head (SPH) for a perpendicular recording.

FIG. 39 is a schematic diagram for explaining a problem occurred during recording with single pole head (SPH) for a perpendicular recording. The perpendicular recording with SPH having a feature that the side fringing effect is extremely small than the in-plane recording with the ring-head, since the magnetic field of the edge portion is rapidly reduced.

The recording by the above-mentioned head having a skew angle has a demerit because of recording at side portion of the head. When a skew angle is not zero, a width of trailed area by side of the edge is widened and a normal recorded area is not finally performed by the trailing edge at another edge. Therefore, an invalid area is extremely extended at read operation.

In order to solve the above problem, in the present invention, an arbitrary portion of the pole of the write head of the leading side is made in a shape of the pole being in an area trailed by trailing edge of the write head on an arbitrary track from the innermost track to the outermost track. The specific examples of the write head show in FIGS. 40A to 43. It is assume that a skew angle at which the head position determined at the outermost track is $\theta_{out}$ and a skew angle at which the head position is determined at the innermost track is $\theta_{in}$. For convenience, a sign of the angle is determined that $\theta_{out}$ is positive direction and $\theta_{in}$ is negative direction, relatively.

Figures 40A, 40B, 40C:
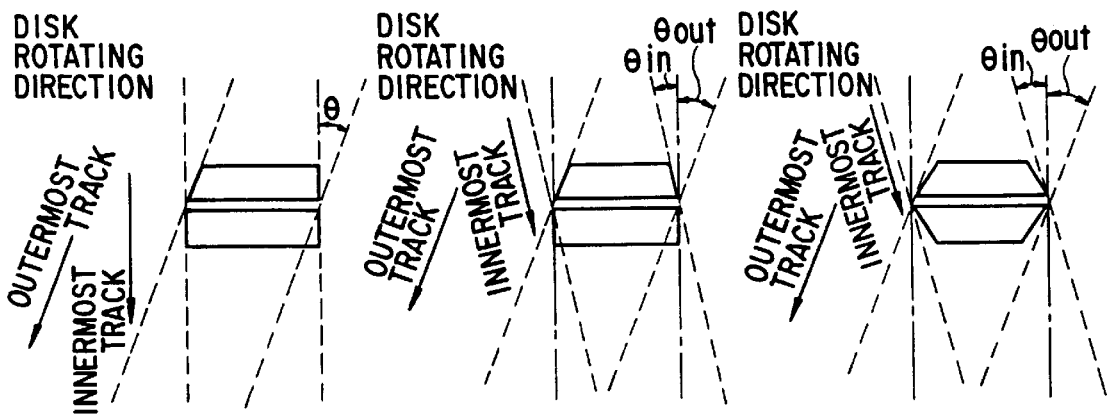
FIGS. 40A to 40C show examples of improved ring heads.

FIGS. 40A to 40C show in some cases of ring head. In a case that one of the angle of the skew angle $\theta_{out}$ or $\theta_{in}$ is 0° or the same sign, one of the pole of the reading side may be trimmed. In a case that the skew angle is negative at inner circumference side and positive at outer circumference side, the head may be trimmed as shown in FIG. 40B. The head may be trimmed shown in FIG. 40C for the purpose of further lowing the side fringing.

Figures 41A, 41B, 41C:
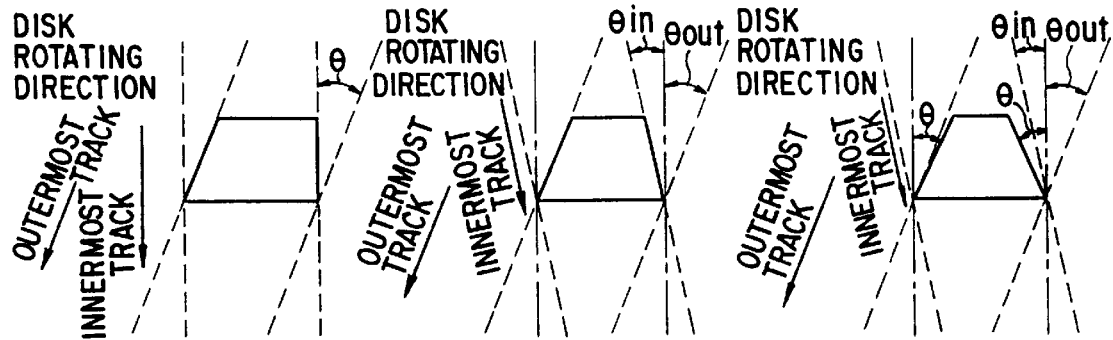
FIGS. 41A to 41C show examples of improved single pole heads.

FIGS. 41A to 41C show in some cases of an SPH. In the SPH, which is same as the ring head, in a case that one of the angle of the skew angle $\theta_{out}$ or $\theta_{in}$ is 0° or the same sign, one of the pole of the reading side may be trimmed. In a case that the skew angle is negative at inner circumference side and positive at outer circumference side, the head may be trimmed as shown in FIG. 41B. The head can be trimmed shown in FIG. 41C to share up-faced head and down-faced head ($|\theta|>|\theta_{out}|, |\theta_{in}|$).

Figure 42:
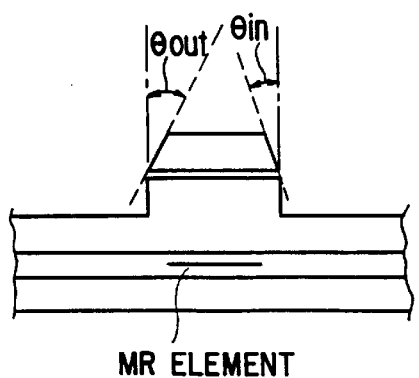
FIG. 42 shows an example of a trimmed Merged type MR composite head.
Figure 43:
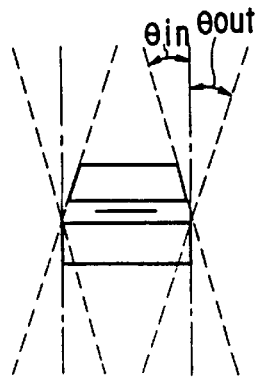
FIG. 43 shows an example of a trimmed In-Gap type MR composite head.

FIG. 42 shows an example of a trimming of a Merged type MR composite head and FIG. 43 shows an example of a trimming of an In-Gap type MR composite head. In FIGS. 42 and 43, the various shapes can be employed according to the sign of skew angles $\theta_{out}, \theta_{in}$ and other conditions same as FIGS. 40A to 40C.

The method of trimming is performed as follows. The composite head is made in a normal process and a portion except for desired deleting portion deleted by trimming is masked by resist. The resist is removed after trimming such as a method of etching or ion milling. A well-known art such as FIB (Focused Ion Beam) processing can be employed as a trimming.

As described above, by using the above-mentioned write/read composite head of the present invention, since an influence of such as side fringing phenomenon can be suppressed in case of using the rotary actuator, it is significantly effective to improve the track density.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive comprising:
   a rotary actuator;
   a rotary actuator arm having a first end and a second end connected to said rotary actuator;
   a composite magnetic head, mounted on said first end of said rotary actuator arm, and structured by integrally combining a write head into a read head;

a magnetic disk having an area where cylinder number information is recorded, an area where sector number information is recorded, a servo area where servo information is recorded, and a data area where data is recorded;

head tracking servo means for providing a positioning offset to said composite magnetic head such that said write head is set to be on-track in the data area of said magnetic disk at a write operation and said read head is set to be on-track state in the data area of said magnetic disk at a read operation; and storing means, including a nonvolatile solid-state memory, for storing defect sector information of said magnetic disk and defect track information, wherein said magnetic disk further comprises an area for recording first cylinder information, second cylinder information and sector number information, wherein the first cylinder information is recorded at a position where the read head is on-track during the read operation, wherein the second cylinder information is recorded at a position where the write head is on-track during the data write operation, and wherein the sector number information is recorded at a forward portion of each data sector with a width at least as large as a track pitch.

2. A magnetic disk drive comprising, a rotary actuator;

a rotary actuator arm having a first and a second end connected to said rotary actuator;

a composite magnetic head, mounted on said first end of said rotary actuator arm, and structured by integrally combining a write head into a read head;

a magnetic disk having an area where cylinder number information is recorded, an area where sector number information is recorded, a servo area where servo information is recorded, and a data area where data is recorded;

head tracking servo means for providing a positioning offset to said composite magnetic head such that said write head is set to be on-track in the data area of said magnetic disk at a write operation and said read head is set to be on-track state in the data area of said magnetic disk at a read operation; and storing means, including a nonvolatile solid-state memory, for storing defect sector information of said magnetic disk and defect track information, wherein said magnetic disk alternately and dispersively records first servo information corresponding to said read head and second servo information corresponding to said write head, and said head tracking servo means includes means for positioning said composite magnetic disk based on position information obtained by synthesizing first position information obtained by cutting a low frequency component including a DC component from first and second position error information showing position errors of the read and write heads alternately obtained from first and second servo information read from said magnetic disk by the head with second position information obtained by selecting first position error information at the read operation and second position error information at the recording time, respectively.

3. A drive according to claim 2, wherein discrimination information for discriminating whether servo information is first servo information or second servo information is preferably included in said first and second servo information recorded in said magnetic disk.

4. A drive according to claim 2, wherein said head tracking servo means further includes a band rejection filter for cutting a frequency component of a ½ sampling rate from said first position information.

5. A drive according to claim 2, wherein said head tracking servo means further includes a low pass filter for cutting a high frequency component of said second position information.

6. A drive according to claim 2, further comprising a Zero-order holding circuit for inputting position error information.

7. A drive according to claim 2, wherein a predetermined portion of a write head pole of reading side of a trailing edge of a write head of said composite magnetic head is situated with in a region scanned by the trailing edge.

8. A magnetic disk drive comprising, a rotary actuator;

a rotary actuator arm having a first and a second end connected to said rotary actuator;

a composite magnetic head, mounted on said first end of said rotary actuator arm, and structured by integrally combining a write head into a read head;

a magnetic disk having an area where cylinder number information is recorded, an area where sector number information is recorded, a servo area where servo information is recorded, and a data area where data is recorded;

head tracking servo means for providing a positioning offset to said composite magnetic head such that said write head is set to be on-track in the data area of said magnetic disk at a write operation and said read head is set to be on-track state in the data area of said magnetic disk at a read operation; and a nonvolatile solid-state memory for storing defect sector information of said magnetic disk and defect track information, wherein said magnetic disk alternately and dispersively records first servo information corresponding to said read head and second servo information corresponding to said write head, and said head tracking servo means includes means for positioning said composite magnetic disk based on position information obtained by synthesizing first position information obtained by cutting a low frequency component including a DC component from first and second position error information showing position errors of the read and write heads alternately obtained from first and second servo information read from said magnetic disk by the head with second position information obtained by selecting first position error information at the read operation and second position error information at the recording time, respectively.

* * * * *